(12) United States Patent
Choi et al.

(10) Patent No.: US 9,049,588 B2
(45) Date of Patent: Jun. 2, 2015

(54) COMMUNICATING DATA IN A PREDEFINED TRANSMISSION MODE

(71) Applicant: RESEARCH IN MOTION LIMITED, Waterloo (CA)

(72) Inventors: Noun Choi, Flower Mound, TX (US); Stefano Faccin, Hayward, CA (US)

(73) Assignee: Blackberry Limited, Waterloo, Ontario (CA)

(*) Notice: Subject to any disclaimer, the term of this patent is extended or adjusted under 35 U.S.C. 154(b) by 140 days.

(21) Appl. No.: 13/780,509

(22) Filed: Feb. 28, 2013

(65) Prior Publication Data

US 2014/0242962 A1 Aug. 28, 2014

(51) Int. Cl.
*H04W 8/24* (2009.01)

(52) U.S. Cl.
CPC .................................. *H04W 8/245* (2013.01)

(58) Field of Classification Search
CPC ........ H04W 8/245; H04W 84/06; H04W 4/16
USPC .............. 455/418–420, 436–439, 450, 452.1, 455/464, 509, 428, 445; 370/331–332, 252
See application file for complete search history.

(56) References Cited

U.S. PATENT DOCUMENTS

| | | | | |
|---|---|---|---|---|
| 2012/0281566 | A1* | 11/2012 | Pelletier et al. | 370/252 |
| 2013/0039287 | A1* | 2/2013 | Rayavarapu et al. | 370/329 |
| 2013/0260811 | A1* | 10/2013 | Rayavarapu | 455/509 |
| 2014/0016614 | A1* | 1/2014 | Velev et al. | 370/331 |

OTHER PUBLICATIONS

3GPP TS 23.401 V11.4.0 Technical Specification, 3rd Generation Partnership Project, Technical Specification Group Services and System Aspects, General Packet Radio Service (GPRS) enhancements for Evolved Universal Terrestrial Radio Access Network (E-UTRAN) access (Release 11) (Dec. 2012) (284 pages.)
3GPP TS 23.682 V11.3.0 Technical Specification 3rd Generation Partnership Project, Technical Specification Group Services and System Aspects, Architecture enhancements to facilitate communications with packet data networks and applications (Release 11) (Dec. 2012) (29 pages).
3GPP TR 23.887 V0.8.0 Technical Report 3rd Generation Partnership Project, Technical Specification Group Services and System Aspects, Machine-Type and other Mobile Data Applications Communications Enhancements (Release 12) (Feb. 2013) (107 pages).
3GPP TR 23.888 V11.0.0 (2012-09) Technical Report 3rd Generation Partnership Project, Technical Specification Group Services and System Aspects, System improvements for Machine-Type Communications (MTC) (Release 11) (165 pages).
3GPP TS 24.301 V11.5.0 Technical Specification 3rd Generation Partnership Project; Technical Specification Group Core Network and Terminals, Non-Access-Stratum (NAS) protocol for Evolved Packet System (EPS), Stage 3 (Release 11) (Dec. 2012) (344 pages).

(Continued)

*Primary Examiner* — Cong Tran
(74) *Attorney, Agent, or Firm* — Trop, Pruner & Hu, P.C.

(57) ABSTRACT

Traffic data is communicated between a wireless device and a core network control node in a predefined transmission mode in which traffic data is communicated in a control channel for carrying control messages.

27 Claims, 12 Drawing Sheets

(56) References Cited

OTHER PUBLICATIONS

3GPP TS 29.274 V11.5.0 Technical Specification 3rd Generation Partnership Project, Technical Specification Group Core Network and Terminals, 3GPP Evolved Packet System (EPS), Evolved General Packet Radio Service (GPRS) Tunnelling Protocol for Control plane (GTPv2-C), Stage 3 (Release 11) (Dec. 2012) (227 pages).

3GPP TS 36.300 V11.4.0 Technical Specification 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11) (Dec. 2012) (208 pages).

3GPP TS 36.331 V11.2.0 Technical Specification 3rd Generation Partnership Project, Technical Specification Group Radio Access Network, Evolved Universal Terrestrial Radio Access (E-UTRA), Radio Resource Control (RRC), Protocol specification (Release 11) (Dec. 2012) (340 pages).

3GPP TS 36.413 V11.2.1 Technical Specification 3rd Generation Partnership Project, Technical Specification Group Radio Access Network, Evolved Universal Terrestrial Radio Access Network (E-UTRAN), S1 Application Protocol (S1AP) (Release 11) (Feb. 2013) (272 pages).

3GPP TSG-RAN WG2 Meeting #76 R2-115929 San Francisco, USA, Agenda item: 7.2, Source: Research in UK Limited, Title: Text Proposal for TR 36.822: RRC Connection Setup Analysis, Document for: Decision, Nov. 14-18, 2011 (5 pages).

SA WG2 Meeting #86 S2-113826 Naantali, Finland rev of S2-113677, Source: Vodafone, IPWireless, Title: Efficient small data transmission, Document for: Approval, Agenda Item: 9.4.2.6, Work Item / Release: SIMTC/Rel-11, Jul. 11-15, 2011 (4 pages).

* cited by examiner

\# COMMUNICATING DATA IN A PREDEFINED TRANSMISSION MODE

BACKGROUND

A wireless device can have multiple modes of operation in a wireless communications network. For example, a wireless device can have an idle mode and a connected mode. In the idle mode, a connection is not established between the wireless device and the wireless communications network. As a result, in the idle mode, the wireless device is unable to communicate traffic data with the wireless communications network. On the other hand, in the connected mode, the wireless device has established a connection with the wireless communications network, which allows the wireless device to communicate traffic data with the wireless communications network over the connection.

BRIEF DESCRIPTION OF THE DRAWINGS

Some embodiments are described with respect to the following figures.

DETAILED DESCRIPTION

Figure 1:
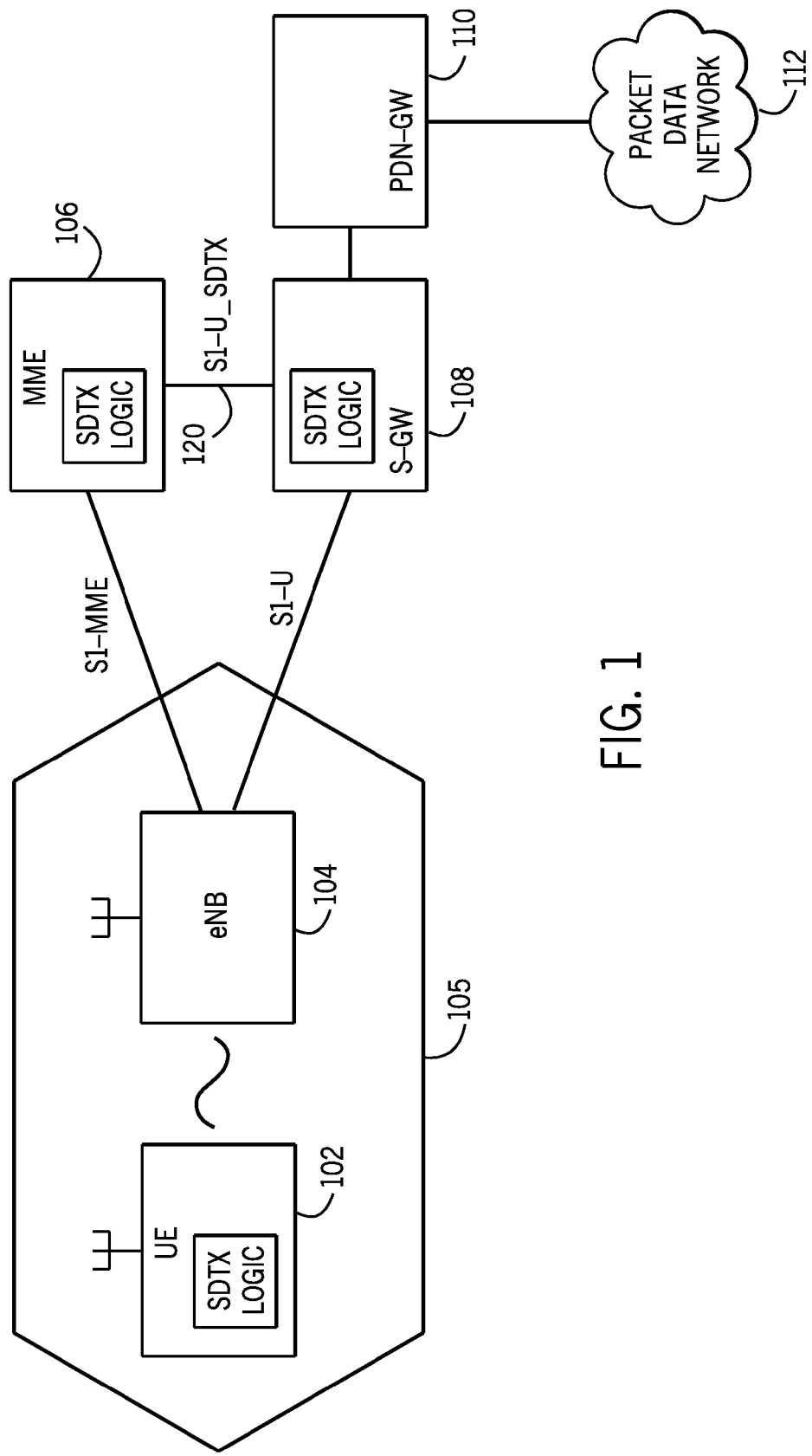
FIG. 1 is a block diagram of an example network arrangement according to some implementations.

When a wireless device is not actively communicating, the wireless device can be placed in an idle mode, in which a connection is not provided between the wireless device and a wireless communications network. In the idle mode, the wireless device does not communicate traffic data, but the wireless device can monitor for a paging message sent by the wireless communications network. Traffic data can refer to user bearer data (e.g. user voice data or other data input by a user), application bearer data (data generated by an application), and other bearer data. To allow the wireless device to communicate traffic data, the wireless device can be transitioned from the idle mode to the connected mode, where a connection is established between the wireless device and the wireless communications network.

In some examples, the wireless communications network can be a Long-Term Evolution (LTE) network that operates according to LTE standards provided by the Third Generation Partnership Project (3GPP). The LTE standards are also referred to as the Evolved Universal Terrestrial Radio Access (E-UTRA) standards. Although reference is made to LTE in the ensuing discussion, it is noted that techniques or mechanisms according to some implementations can be applied to other wireless access technologies.

Examples of wireless devices include mobile telephones, smartphones, tablet computers, notebook computers, desktop computers, server computers, game appliances, and so forth. One type of wireless device is a user equipment (UE), which is a wireless device that is useable by a user. In the ensuing discussion, reference is made to UEs that are able to communicate wirelessly. More generally, techniques or mechanisms according to some implementations can be applied to other types of wireless devices.

According to LTE, the idle and connected modes can be Evolved Packet System (EPS) Connection Management (ECM) modes that describe the signaling connectivity between a UE and a core network of the wireless communications network (the LTE core network is referred to as an Evolved Packet Core or EPC). The ECM modes include an ECM-IDLE mode and the ECM-CONNECTED mode, as defined by the 3GPP TS 23.401. The ECM-CONNECTED mode and ECM-IDLE mode correspond respectively to the following EPS Mobility Management (EMM) modes: EM-CONNECTED and EM-IDLE, as defined by 3GPP TS 24.301. The ECM-CONNECTED mode is identical to the EMM-CONNECTED mode, and the ECM-IDLE mode is identical to the EMM-IDLE mode.

A UE is in the EMM-IDLE mode (or correspondingly, ECM-IDLE mode) when no control signaling (e.g. non-access stratum (NAS) signaling) connection between the UE and the wireless communication network exists. A UE is in the EMM-CONNECTED mode (and correspondingly, in the ECM-CONNECTED mode) when an NAS signaling connection is established between the UE and the wireless communications network. NAS refers to a stratum of a control plane between the UE and the core network. NAS control signaling is used to support mobility of a UE and to support session management procedures for establishing and maintaining Internet Protocol (IP) connectivity between the UE and a packet data network gateway.

In the ensuing discussion, reference is made generally to an idle mode or connected mode of a UE. While the UE is in idle mode, there is no direct communication between the UE and the wireless communications network. When there is downlink or uplink traffic data to send, signaling has to be exchanged between the UE and network nodes, including a wireless access network node and a core network node, to allow the UE to transition to the connected mode for communicating traffic data.

The amount of signaling overhead associated with transitioning the UE from the idle mode to the connected mode can be substantial, which can consume the bandwidth between the UE and the wireless communications network. Moreover, when the UE is in the connected mode, the UE consumes more battery power than when the UE is in the idle mode.

In some cases, a UE may be involved in small data transmissions, where a small data transmission can refer to a transmission of data that is less than some specified amount or satisfies some other characteristic that indicates that the total amount of data to send is relatively low. The small data transmissions can be periodic or non-periodic transmissions. Examples of small data transmissions can include device status reports, configuration parameter updates, heartbeat messages, and so forth. Such small data transmissions may occur in the context of machine-to-machine (M2M) communications in which a UE performs data transmissions with another endpoint, independent of user interaction. Since small data transmissions are relatively sparse, having to transition from the idle mode to the connected mode each time the UE has to perform a small data transmission may be inefficient, especially when the UE has no other traffic data to send.

In accordance with some implementations, a small data transmission (SDTX) mode can be used for communicating a relatively small amount of data in control signaling (rather than in a traffic channel) between the UE and the wireless communications network. More generally, the SDTX mode can be referred to as a "predefined transmission mode," which is a transmission mode in which the amount of downlink or uplink data to be sent is relatively small, according to one or more specified criteria. Various configuration parameters can be specified to define what constitutes a small data transmission. Such configuration parameters can include one or more of the following: an upper threshold on the size of a message for carrying small data, an upper threshold on a number of messages a device can send in a sequence or in a specific time interval, an upper threshold on a length of a session, and so forth.

In some implementations, the control signaling used to carry small data transmissions between the UE and the wireless communications network includes NAS signaling. In other examples, other types of control signaling can be used for carrying small data transmissions.

Network Arrangement

FIG. 1 illustrates an example wireless network arrangement. A UE 102 is provided in a coverage area 105 (also referred to as a cell) of a wireless access network node 104. According to LTE, a wireless access network node can be implemented as an enhanced Node B (eNB), which includes functionalities of a base station and base station controller. The UE 102 is able to wirelessly communicate with the eNB 104. The eNB 104 is in turn connected to a Mobility Management Entity (MME) 106 and a serving gateway (S-GW) 108.

The MME 106 is the control node that performs control plane signaling with a UE. The MME 106 is responsible for idle mode UE tracking and paging procedures, among other tasks. NAS signaling is established between the MME and the UE. The S-GW 108 routes and forwards traffic data packets (in a user plane), while also acting as the mobility anchor for the user plane during handover between wireless access network nodes. The interface between the MME 106 and the eNB 104 is referred to as an S1-MME interface, while the interface between the S-GW 108 and the eNB 104 is referred to as an S1-U interface.

The S-GW 108 is in turn connected to a packet data network gateway (PDN-GW) 110, which provides connectivity from a UE to an external packet data network 112 (e.g. the Internet, local area network, wide area network, etc.). The PDN-GW 110 is the point of exit and entry of traffic for the UE. Although just one eNB 104, one MME 106, one S-GW 108, and one PDN-GW 110 are depicted, it is noted that in other examples, there can be multiple eNBs, MMEs, S-GWs, and PDN-GWs.

The MME 106, S-GW 108, and PDN-GW 110 are part of the core network of a wireless communications network. In other examples, other types of core network nodes can be employed.

As shown in FIG. 1, various entities can include SDTX logic to support SDTX communications in SDTX mode, according to some implementations. In the example of FIG. 1, each of the UE 102, MME 106, and S-GW 108 110 can include respective SDTX logic.

Transitioning to the SDTX Mode of Operation

Traditionally, traffic data (either downlink data or uplink data) is communicated between the UE 102 and eNB 104 (over the air interface), and between the eNB 104 and the S-GW 108 (over the S1-U interface). Communication of traffic data is not allowed between the S-GW 108 and the MME 106.

In accordance with some implementations, an S1-U_SDTX interface 120 can be established between the MME 106 and the S-GW 108, for communicating traffic data. More generally, the interface 120 can include a user plane path between the MME 106 and the S-GW 108, to allow for the communication of UE traffic data, either in the uplink or downlink direction. Establishment of the S1-U_SDTX interface 120 is discussed further below.

Figure 2:
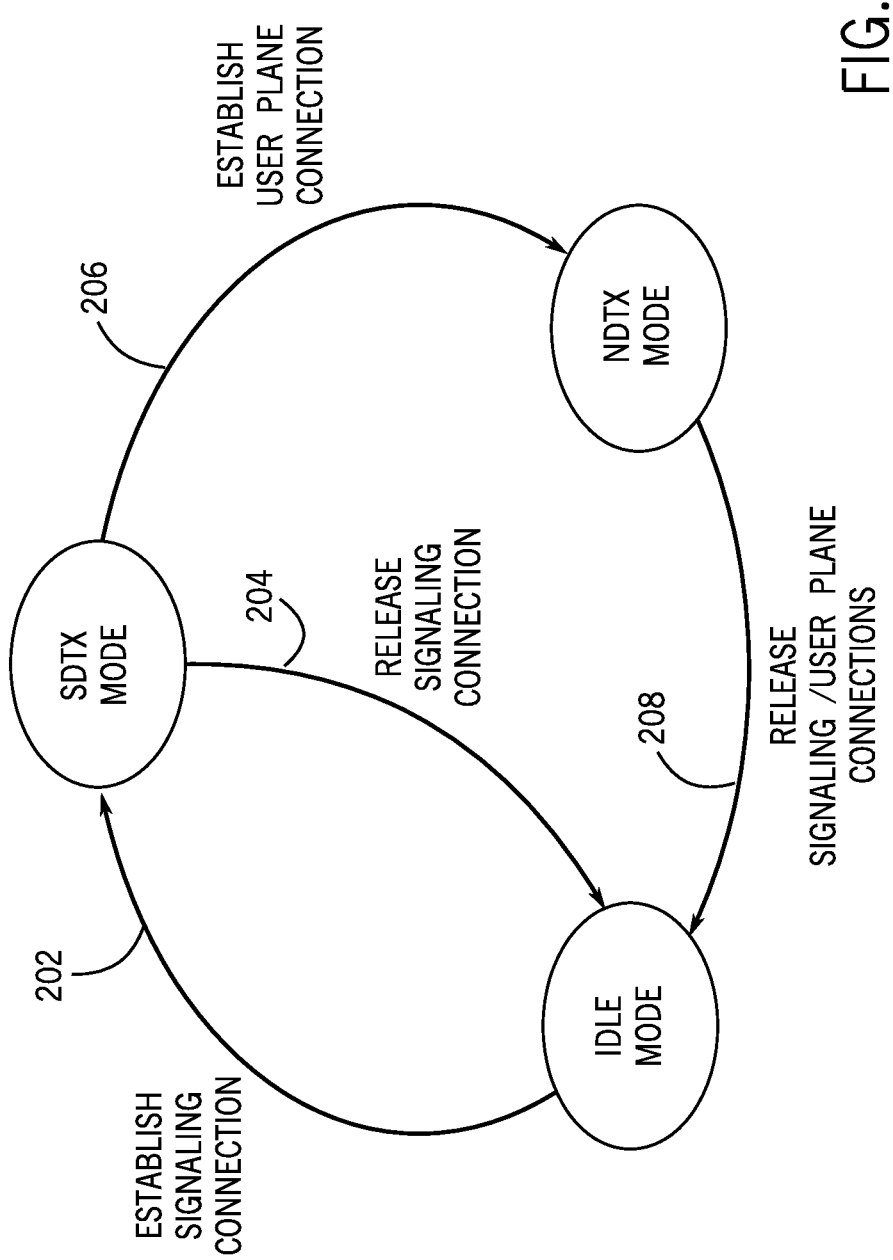
FIG. 2 is a state diagram of modes of a user equipment (UE) according to some implementations.

To avoid having to transition the UE 102 to a fully connected mode (where both signaling and traffic data connections are established) each time there is traffic data (uplink data or downlink data) to communicate, especially when the amount of data is relatively small, a new mode of operation of the UE (in addition to the idle mode and the fully connected mode, also referred to as a normal data transmission (NDTX) mode) can be established. FIG. 2 is a state diagram illustrating three modes of operation: idle mode, SDTX mode, and NDTX mode. Each of the SDTX and NDTX modes is a subset of the ECM-CONNECTED (or EMM-CONNECTED) mode. In the idle mode, the UE 102 does not have a connection with the wireless communications network. In the NDTX mode, the UE 102 has a user plane connection established as well as a signaling connection in both the access stratum (AS) and NAS layers. The AS layer provides the mechanisms to carry information over the radio interface between the UE 102 and the eNB 104.

In the SDTX mode, the UE 102 has a signaling connection in both the AS and NAS layers, but the UE 102 does not have an established user plane connection. The SDTX mode can also be referred to as the ECM-SDTX mode or EMM-SDTX mode.

Assuming that the UE starts in the idle mode, the UE can transition from the idle mode to the SDTX mode upon establishing a signaling connection, as indicated by transition 202. The signaling connection can be an NAS signaling connection. Upon releasing the signaling connection in the SDTX mode, the UE transitions (at 204) back to the idle mode. However, in the SDTX mode, the UE can transition (at 206) to the NDTX mode upon establishing the user plane connection (which can include establishing the radio access bearers for the air interface and S1 bearers for the S1-U interface, for example). The UE transitions (at 208) from the NDTX mode back to the idle mode upon release of the signaling and user plane connections.

Figure 3:
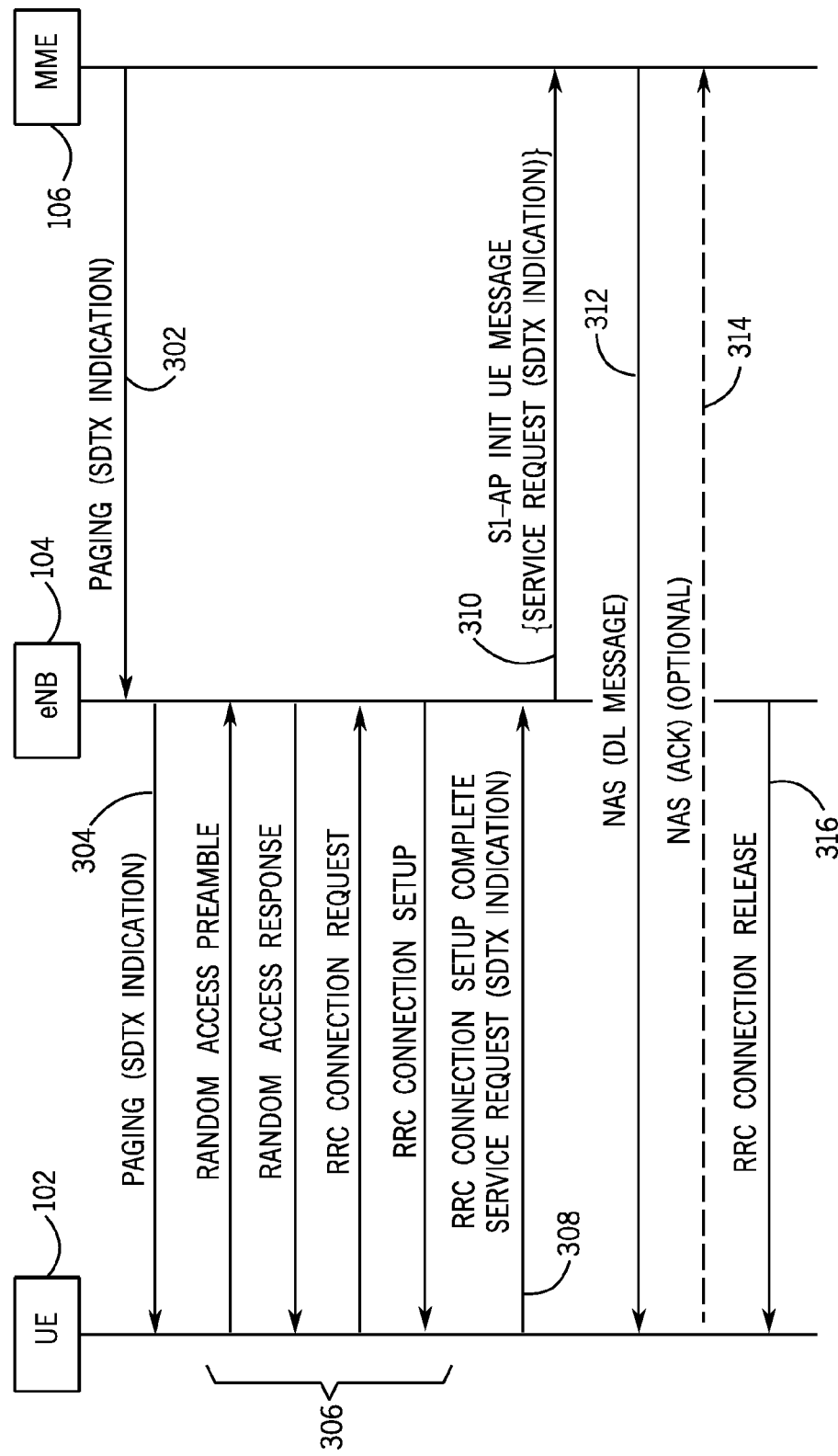
FIGS. 3 and 4 are message flow diagrams for communicating downlink traffic data and uplink traffic data, respectively, using small data transmission (SDTX) communication according to some implementations.

FIG. 3 shows an example for communicating downlink small data to the UE 102, using the SDTX mode. When the MME 106 determines that there is downlink traffic data pending for delivery to an SDTX-capable UE 102, which is in the idle mode, then the MME 106 can determine (based on an implementation-specific mechanism, an operator configuration, and so forth) whether the SDTX mode should be used for delivery of the downlink traffic data to the UE 102. For example, the MME 106 can determine whether the SDTX mode is to be used based on one or more SDTX configuration parameters, as discussed above. If the SDTX mode is to be used, then the MME 106 establishes an NAS channel (more generally, a control channel) with the UE 102 without establishing the user plane radio access bearers (between the eNB 104 and the UE 102) nor the S1-U bearers (between the S-GW 108 and the eNB 104). The NAS channel (more generally, a control channel) is a channel in which NAS message (more generally, control messages) are communicated. As depicted in FIG. 3, establishment of the NAS channel without establishing the corresponding user plane connections (RABs or S1-U bearers) is accomplished by sending (at 302) a paging message that contains a predefined SDTX indication (which can be in the form of a flag or other indicator set to a particular value, for example). In this example, if the flag is set to a different value, then the paging message is without an SDTX indication.

The SDTX indication indicates that the SDTX mode of operation should be used for communicating the downlink traffic data. In some examples, the SDTX indication can be a new value included in the CN-Domain information element of the paging message. The CN-Domain information element is typically used for indicating the origin of the paging message (e.g. whether the origin is a circuit-switched domain or a packet-switched domain). The paging message sent from the MME 106 to the eNB 104 can be according to the S1 Application Protocol (S1-AP), which provides the signaling service between the eNB 104 and the MME 106. In further implementations, the MME 106 can further include SDTX configuration parameters in the paging message sent at 302. Examples of SDTX configuration parameters can include one or some combination of the following: an upper threshold on a size of a message that can be used to carry traffic data in SDTX mode, an upper threshold on a number of SDTX messages a device can send in a sequence or within a specific time interval, an upper threshold on the length of a session in which SDTX communications occur, an identity of a radio bearer (or identities of radio bearers) that is (are) specified for carrying small data transmissions, and so forth.

In other implementations, instead of sending the SDTX configuration parameters to the UE 102 over the air interface, the SDTX configuration parameters can be preconfigured in the UE 102.

The eNB 104, in response to the received paging message, sends (at 304) a corresponding paging message over the air interface to the UE 102. The paging message sent at 304 also includes the SDTX indication, which can be in the CN-Domain information element, for example.

Upon receiving the paging message with the SDTX indication, the UE 102 responds by first performing (at 306) a procedure to allow for establishment of a Radio Resource Control (RRC) connection. The procedure (306) includes the UE 102 going through a contention-based random access procedure (initiated by the UE sending a random access preamble) to acquire a chance of scheduled transmission. The eNB 104 can respond to the random access preamble by sending a random access response. The random access procedure is described in 3GPP TS 36.300, in some examples. The UE 102 can establish a RRC connection with the eNB 104 by sending an RRCConnectionRequest message. The eNB 104 can respond to the RRCConnectionRequest message by sending an RRCConnectionSetup message to indicate establishment of the RRC connection. The RRC connection establishment procedure is described in 3GPP TS 36.331, in some examples.

Upon successful establishment of the RRC connection, the UE 102 sends (at 308) a Service Request message with an SDTX indication. In some examples, the Service Request message sent at 308 is included in the RRCConnectionSetup Complete message that acknowledges completion of RRC connection setup. The Service Request message can be an NAS message. The Service Request message with the SDTX indication can be an Extended Service Request message, in some examples.

The SDTX indication is provided in the Service Request message to ensure that the MME 106 does not trigger establishment of a user plane connections (RABs and S1-U bearers) in response to the Service Request message. Upon sending the Service Request message (at 308), the UE also transitions to the SDTX mode (FIG. 2). If the SDTX configuration parameters were included in the paging message (sent at 304), the UE 102 also stores the SDTX configuration parameters in the UE 102.

In the SDTX mode, the UE is ready to communicate traffic data (including receiving the downlink traffic data that is pending at the MME 106) using NAS signaling (or other control signaling) instead of using a user plane connection.

Upon receiving the Service Request message (sent at 308), the eNB 104 sends (at 310) the Service Request message with the SDTX indication in an S1-AP Init UE message to the MME 106. In other examples, the Service Request message sent at 310 can be included in another message from the eNB 104 to the MME 106.

In response to receipt of the Service Request message sent at 310, the MME 106 sends an NAS enveloped downlink message that contains the downlink traffic data using pre-established NAS security. An NAS enveloped downlink message is an NAS control message that contains downlink traffic data.

In some examples, the UE 102 can send (at 314) an acknowledgement of the downlink traffic data in an NAS message back to the MME 106. In other examples, the acknowledgement is not sent to the MME 106.

After the downlink traffic data transmission ends, the eNB 104 can decide to release the RRC connection after the eNB detects an inactive time period (based on using an inactivity timer, for example). This is accomplished by sending (at 316) a connection release message, e.g. RRCConnectionRelease message, from the eNB 104 to the UE 102. The inactivity time for release of the RRC connection at the eNB 104 is shorter than the inactivity timer that is used for transitioning the UE 102 from the NDTX mode to the idle mode. Transitioning the UE 102 from the SDTX mode to the idle mode is quicker than transitioning the UE 102 from the NDTX mode to the idle mode, since in the SDTX mode the UE 102 has only signaling bearers established.

Alternatively, the MME 106 can signal the eNB 104 to release the RRC connection when an SDTX inactivity timer at the MME 106 expires. This inactivity timer at the MME 106 can be set to a relatively small value. In some implementations, the MME 106 can start the SDTX inactivity timer upon sending or receiving a traffic data message encapsulated in NAS signaling. At timeout of the SDTX inactivity timer, the MME 106 sends a message (e.g. S1 UE Context Release Command message) to the eNB 104 to request release of the RRC connection.

Figure 4:
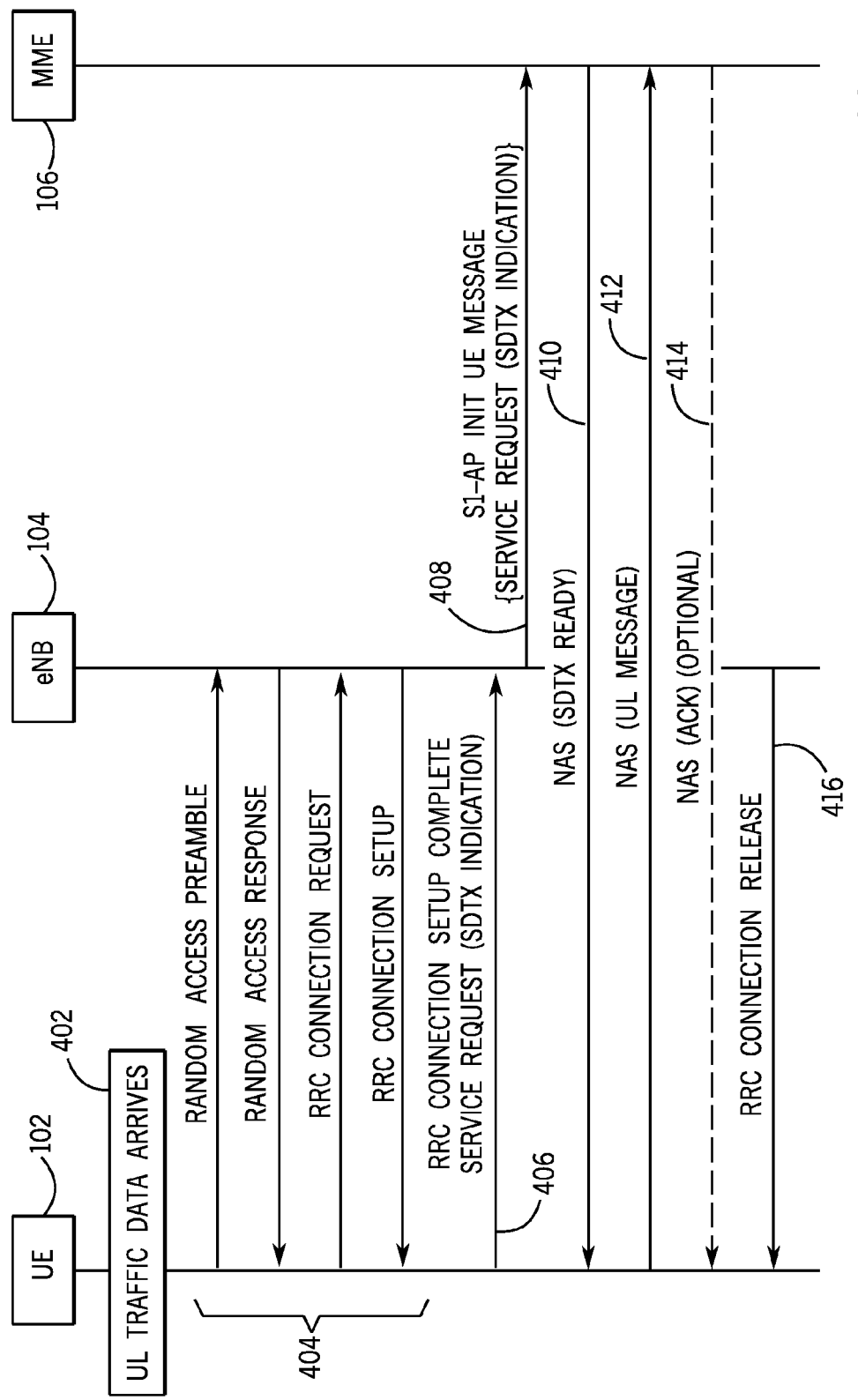

FIG. 4 is a message flow diagram relating to sending uplink data using the SDTX mode. As shown in FIG. 4, uplink data arrives (at 402) in the UE 102. This uplink data can be generated by an application executing in the UE 102, for example. If the UE 102 determines that the uplink traffic data should be sent using SDTX transmission (such as based on one or more SDTX configuration parameters), and if the MME 106 is SDTX-capable, then the UE 102 can perform (at 404) a procedure to enable establishment of an RRC connection. Upon successful establishment of the RRC connection, the UE 102 can send (at 406) a Service Request message or an extended Service Request message containing the SDTX indication, such as in the RRCConnectionSetupComplete message. The eNB 104 in turn sends (at 408) the Service Request message with the SDTX indication to the MME 106. The SDTX indication indicates to the MME 106 that the SDTX transmission is to be used for communication of uplink traffic data.

Upon receiving the Service Request message with the SDTX indication, the MME 106 determines whether the SDTX mode can be used for the transmission of the uplink traffic data, based on a local configuration, the SDTX configuration parameters, user subscription, and so forth. If the MME 106 determines that the SDTX mode can be used, then the MME 106 sends (at 410) an SDTX ready indication in a downlink NAS message. The SDTX ready indication indicates to the UE 102 that the MME 106 is ready for the SDTX uplink transmission over the NAS channel, and that the UE 102 is allowed to send uplink data in the SDTX mode using NAS messages in the NAS channel. The SDTX ready indication can contain SDTX configuration parameters, in some examples.

In response to receiving the SDTX ready indication, the UE 102 sends (at 412) the uplink traffic data in an NAS message using pre-established NAS security. The MME 106 can optionally respond (at 414) with an acknowledgement in an NAS message. The eNB 104 can then send (at 416) a message, e.g. RRCConnectionRelease message, to release the RRC connection between the eNB 104 and the UE 102. The decision to release the RRC connection can be made by the eNB 104. Alternatively, the decision to release the RRC connection can be made by the MME 106, which can then instruct the eNB 104 to release the RRC connection.

When the UE is in the SDTX mode, small data (downlink or uplink data) is enveloped by an NAS message carried over SRB1 (signaling radio bearer 1), for which AS security is not applied. However, the NAS message is still encrypted using NAS security.

Figure 5:
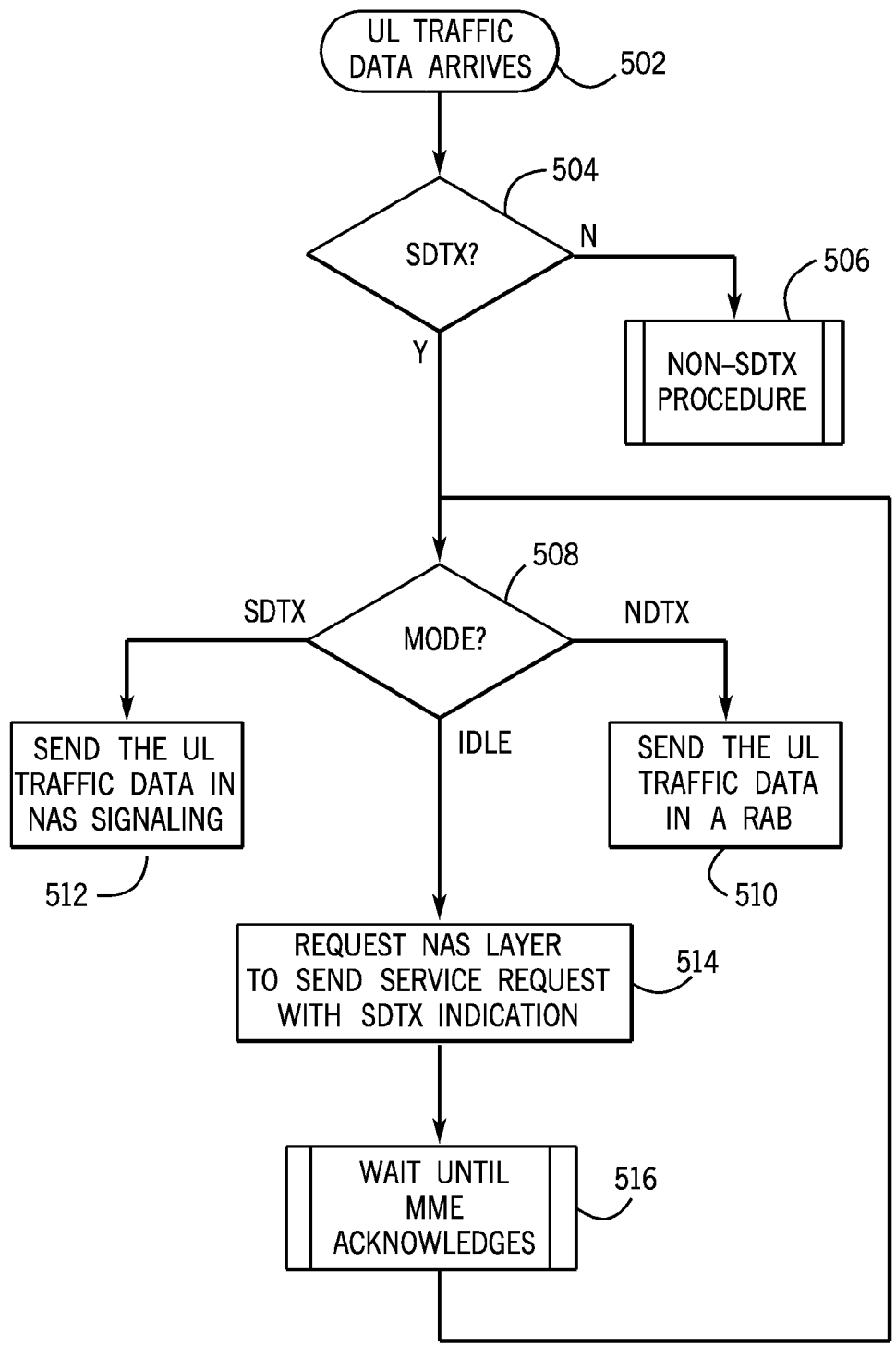
FIG. 5 is a flow diagram of a process performed by an SDTX handler in a UE, according to some implementations.

FIG. 5 is a flow diagram of a process performed by the UE 102 for uplink traffic data that is to be transmitted by the UE 102. In some examples, the process of FIG. 5 can be performed by an SDTX handler. The SDTX handler can be at a layer above the NAS layer, or can be part of the NAS layer.

Upon arrival (at 502) of uplink traffic data to transmit, the SDTX handler decides (at 504) whether to use the SDTX mode. This decision can be based on SDTX configuration parameters, such as those listed above.

If the SDTX handler decides to use non-SDTX communication, then the uplink traffic data is communicated using (at 506) a non-SDTX procedure (e.g. send the uplink traffic data using user plane communication).

If the SDTX handler decides to use the SDTX mode, then the SDTX handler checks (at 508) a current mode of the UE 102, which can be one of the modes depicted in FIG. 2. If the current mode is the NDTX mode, then SDTX causes the uplink traffic data to be sent (at 510) through an established radio access bearer. However, if the UE 102 is in the SDTX mode, then the SDTX handler requests the NAS layer to send (at 512) the uplink traffic data to be sent in NAS signaling. The NAS layer encapsulates the uplink traffic data with an NAS container and sends the uplink NAS message to the MME 106.

If the UE is in the idle mode, then the SDTX handler can request (at 514) the NAS layer to send a Service Request message (406 in FIG. 4) with the SDTX indication. The SDTX handler waits (at 516) for the MME 106 to acknowledge (with the SDTX ready indication sent at 410 in FIG. 4).

Upon receiving the SDTX ready indication, the process returns to decision block 508. Note that receipt of the SDTX ready message causes the UE 102 to transition to the SDTX mode, which will allow the SDTX handler to send the uplink traffic data in NAS signaling.

Transitioning from SDTX Mode to NDTX Mode

Once the UE 102 enters SDTX mode and traffic data (uplink data or downlink data) is communicated using SDTX mode, it may become possible that at some point, the data to be communicated may no longer satisfy the SDTX configuration parameters. For example, the data size can exceed the upper threshold on the size of a message for SDTX, or the number of messages can exceed the threshold on the number of messages to be sent in a sequence or within a given time interval, or the upper threshold on the length of a session may be exceeded. Allowing SDTX communication to continue in the SDTX mode is not desired once an SDTX configuration parameter is violated.

In accordance with some implementations, either the UE 102 or the MME 106 can detect the violation of the SDTX configuration parameter(s), and can make the determination that the UE should transition from the SDTX mode to the NDTX mode for further communication of traffic data. The MME 106 can detect that downlink traffic data to be delivered violates at least one SDTX configuration parameter, or the UE 102 can detect that uplink traffic data can violate at least one SDTX configuration parameter.

Figure 6:
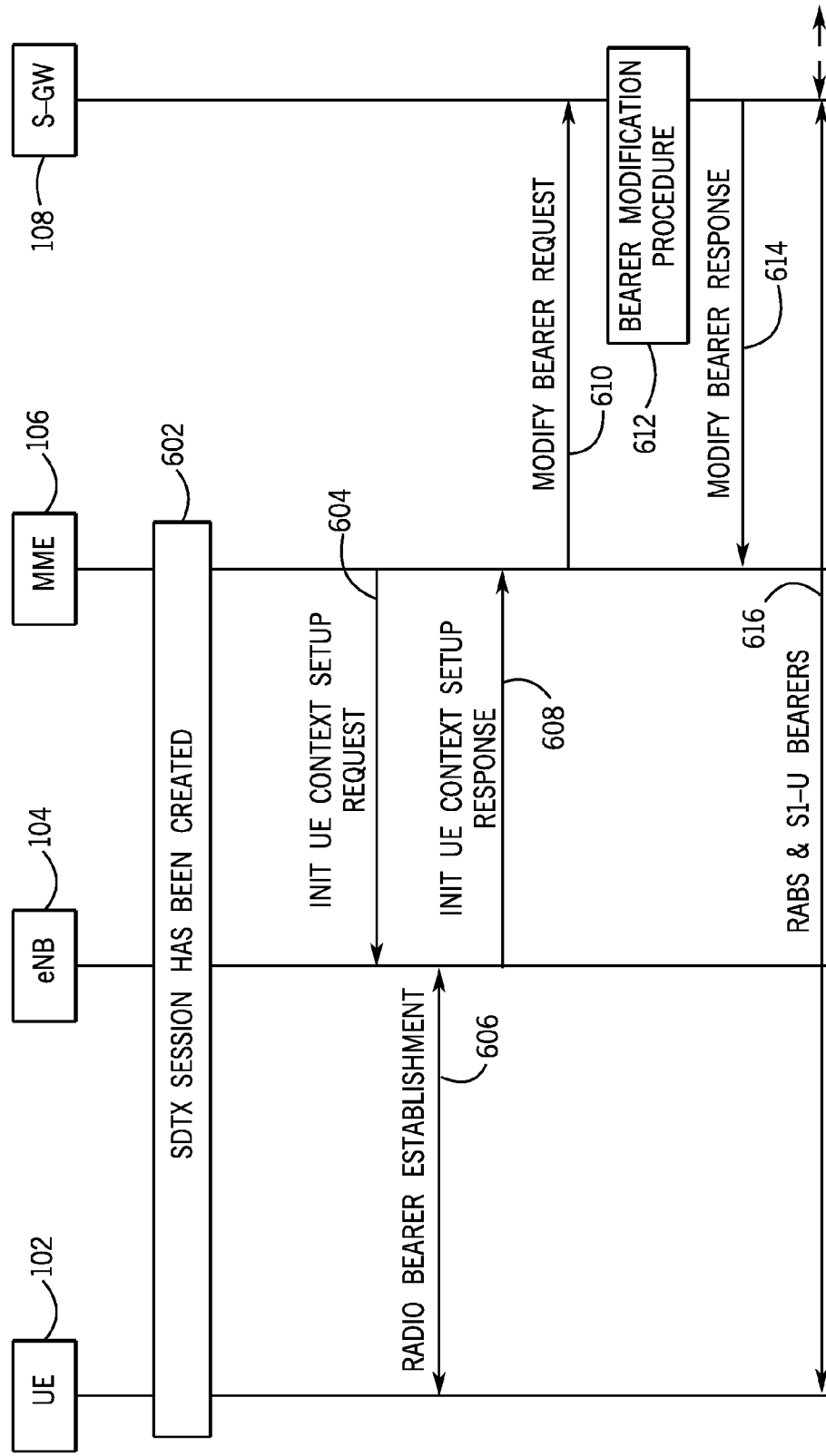
FIGS. 6 and 7 are message flow diagrams for transitioning from SDTX mode data communication to normal data transmission (NDTX) mode data communication, according to some implementations.

FIG. 6 is a message flow diagram of an example in which the MME 106 makes the determination to move the UE from the SDTX mode to the NDTX mode. Initially, it is assumed that an SDTX session (602) is ongoing.

If the MME 106 determines that further (downlink or uplink) traffic data is to be communicated in the NDTX mode rather than the SDTX mode, then the MME 106 can perform a radio access bearer setup procedure. Radio access bearer establishment is triggered by the MME 106 sending (at 604) an Initial UE Context Setup Request message to the eNB 104. It noted that the MME 106 can trigger radio access bearer establishment by sending the S1 Initial UE Context Setup Request to the eNB 104 serving the UE 102 even if the UE 102 is in the middle of a series of small data transmissions.

In response to the Initial UE Context Setup Request message, the eNB 104 performs (at 606) a procedure to establish the radio access bearers for the UE 102. Upon successful radio access bearer establishment, the UE 102 moves from the SDTX mode to the NDTX mode, and all further user plane data will be carried over the respective user plane radio access bearers and S1-U bearers.

Once the radio access bearer establishment has been completed, the eNB 104 sends (at 608) an S1 Initial UE Context Setup Complete message to the MME 106. In response, the MME 106 sends (AT 610) A Modify Bearer Request message to the S-GW 108 to cause the S-GW 108 to establish (at 612) an S1-U connection (e.g. set up S1 eNB F-TEIDs for all active bearers) between the S-GW 108 and the eNB 104. If the S-GW 108 responds (at 614) with a Modify Bearer Response message to the MME 106, the procedure is complete and the traffic data will flow over user plane radio access bearers and S1-U bearers (616).

In the second embodiment, upon receiving Service Request message without SDTX flag from a UE in the SDTX mode, the MME triggers U-plane RAB establishment and S1-U establishment and behaves as if it the MME received the Service Request message for the UE while the UE is in the idle mode.

Figure 7:
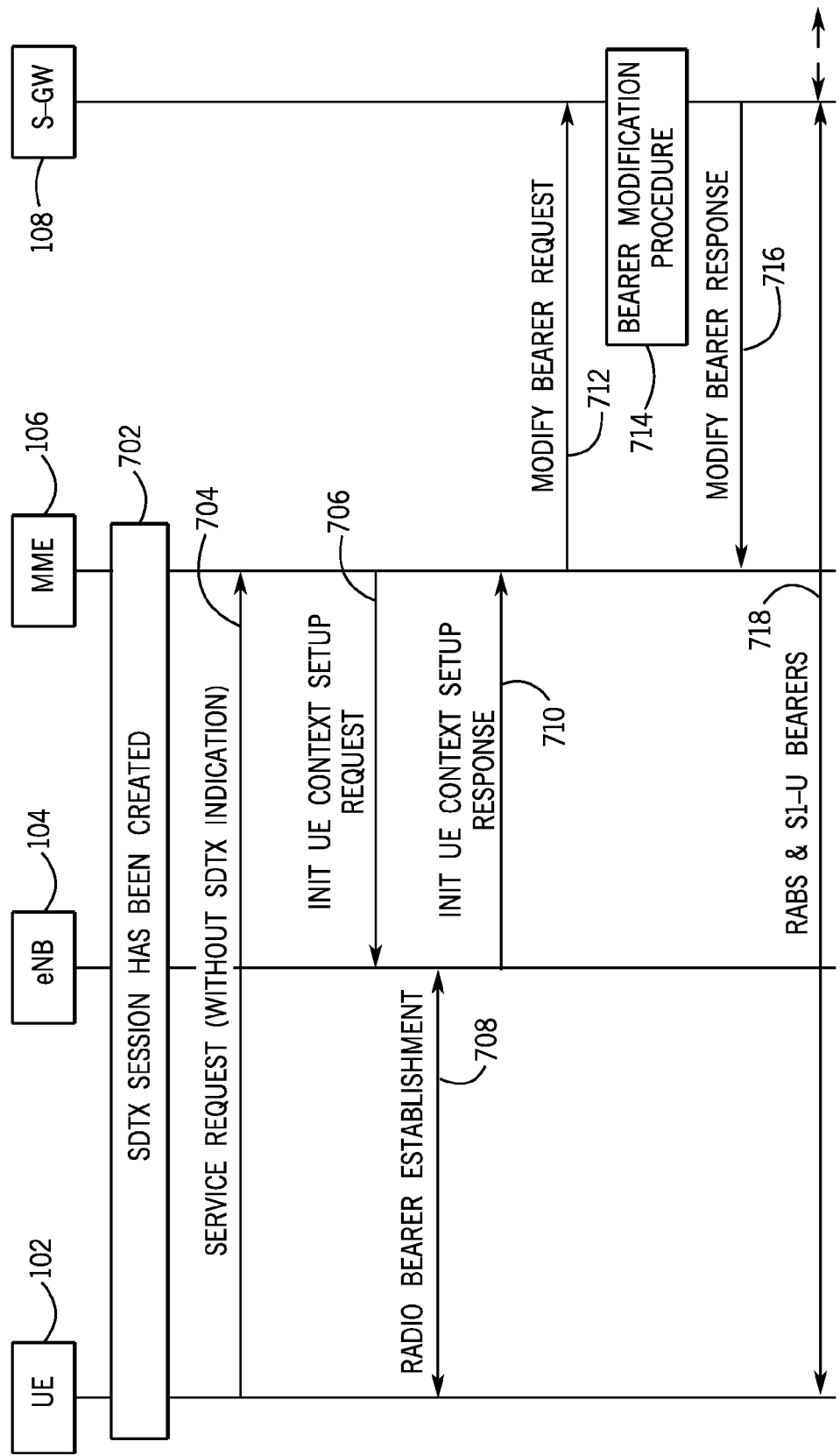

FIG. 7 illustrates a message flow diagram in which the UE 102 makes the determination to transition from the SDTX mode to the NDTX mode. Initially, it is assumed that an SDTX session (702) is ongoing.

Upon detecting that the traffic data sent or the traffic data received by a UE 102 in SDTX mode no longer satisfies the SDTX configuration parameters, the UE 102 stops performing SDTX mode communication. Instead, the UE sends (at 704) a Service Request message to the MME 106 without the SDTX indication to trigger the establishment of the user plane radio access bearers. On receiving the Service Request message from the UE 102, the MME 106 behaves in a similar way as if the MME 106 receives an ordinary Service Request message from an idle mode UE. The remaining tasks 706, 708, 710, 712, 714, 716, and 718 are identical to tasks 604, 606, 608, 610, 612, 614, and 616, respectively.

In general, according to some implementations, a control node in a core network of a wireless communications network performs communication of traffic data with a wireless device in a predefined transmission mode in which the traffic data is communicated in a control channel for carrying control messages. In response to the control node determining violation of at least one configuration parameter of the predefined transmission mode, the control node initiates a procedure to establish a radio access bearer with the wireless device to perform user plane communication of traffic data by sending a message to the wireless access network node.

In some implementations, the control node further sends a request to a data gateway to establish a user plane bearer between the data gateway and a wireless access network node.

In general, according to some implementations, a wireless device performs traffic data communication, with a control node in a core network of a wireless communications network, in a predefined transmission mode in which the traffic data is communicated in a control channel for carrying control messages. In response to the wireless device determining violation of at least one configuration parameter of the predefined transmission mode, the wireless device initiates a procedure to establish a radio access bearer with the wireless device to perform connected mode communication of traffic data by sending a message to the control node in a core network.

Interaction Between MME and S-GW

To enable SDTX mode communication, FIG. 1 shows a user plane path 120 (referred to as an S1-U_SDTX interface in some examples) to exchange traffic data between the MME 106 and the S-GW 108 for both uplink and downlink SDTX data transfers. Without a defined user plane path between the MME 106 and S-GW 108, the sending of traffic data between the MME 106 and S-GW 108 may lead to problems.

For example, if a UE is in idle mode, receipt of downlink traffic data by the S-GW 108 would typically trigger the S-GW 108 to send a Downlink Data Notification (DDN) message to the MME 106 to inform the MME 106 that there is incoming data and to allow the MME 106 to trigger the paging of the UE. DDN is a control plane message that typically cannot carry traffic data. If multiple downlink traffic data messages arrive at the S-GW 108, the S-GW 108 will typically suppress the corresponding DDN(s) for the later downlink traffic data message(s), which can delay the delivery of the later downlink traffic data message(s).

In accordance with some implementations, the S1-U_S-DTX interface 120 (between the S-GW 108 and MME 106) is similar to the S1-U interface between an S-GW and eNB. The S1-U_SDTX interface 120 is established between the SDTX-capable MME 106 and the S-GW 108 when an SDTX-capable UE for which SDTX is allowed by the MME 106 is not in the NDTX mode (i.e. when the SDTX capable UE is in the idle mode or the SDTX mode). The S1-U_SDTX interface is capable of carrying user plane data in similar fashion as the S1-U interface. For the S1-U_SDTX interface 120, the S-GW 108 treats the MME 106 as an eNB. When a downlink traffic data message is received, the message is relayed by the S-GW 108 to the MME 106. Note that the S-GW 106 does not have to be SDTX-capable.

When an SDTX-capable UE establishes an EPS bearer with the PDN-GW 110 (FIG. 1), the UE indicates whether the EPS bearer is suitable to be used in SDTX mode by introducing a new flag or other indicator to indicate that an SDTX EPS bearer should be established. An EPS bearer is a virtual connection between the UE and the PDN-GW 110. If the UE wants to use a default bearer for SDTX communications, the UE can include an SDTX indication (the flag or other indicator set to a particular value) in a message relating to activation of a default EPS bearer. An example of such a message is the ACTIVATE DEFAULT EPS BEARER CONTEXT ACCEPT message. A default bearer is an EPS bearer established between the UE and the PDN-GW 110 that is established whenever the UE establishes a packet data network connection. The packet data network connection can also include other EPS bearer(s), referred to as dedicated bearer(s).

If a UE wants to use a newly created dedicated bearer for SDTX communications, the UE can include the SDTX indication in a message relating to activation of a dedicated bearer, such as an ACTIVATE DEDICATED EPS BEARER CONTEXT ACCEPT message. The UE can also modify an existing EPS bearer designated for SDTX communications to an EPS bearer for regular connected-mode communications by including an SDTX flag or other indicator (with a cleared value) in a message relating to modifying an EPS bearer, such as a BEARER RESOURCE MODIFICATION REQUEST message.

In response to any of the foregoing EPS bearer activation or modification messages, the MME 106 can store or update the value of the SDTX flag or other indicator for the corresponding EPS bearer.

The MME 106 establishes a user plane path, the S1-U_S-DTX interface 120, with the S-GW 108 when the UE enters into the idle mode. The establishment of the S1-U_SDTX interface 120 upon the UE's transition to the idle mode from the NDTX mode by switching the S1-U interface between the S-GW 108 and the serving eNB 104 to between the S-GW 108 and the MME 106 as if handover occurred.

The MME 106 can do so by requesting the S-GW 108 to establish an S1-U bearer by providing an address of the MME 106 instead of an address of the eNB 104. Thus, the S1-US-DTX interface 120 is established between an address of the MME 106 and an address of the S-GW 108. The addresses can be Internet Protocol (IP) addresses. In addition, the MME 106 can store a mapping between an EPS bearer ID (for identifying an EPS bearer) and an S1-U tunnel ID (for identifying an S1-U bearer) for mapping the uplink and downlink traffic of the identified EPS bearer to the corresponding S1-U bearer. When a downlink traffic data message arrives at the S-GW 108, the S-GW 108 forwards the downlink traffic data message to the MME 106 instead of sending a DDN to the MME 106. When an uplink traffic data message arrives from the UE at the MME 106 through NAS signaling, the MME 106 forwards the uplink traffic data message to the S-GW 108.

In alternative implementations, the S1-U_SDTX interface is established only for SDTX EPS bearers (those EPS bearers indicated by a bearer activation or modification message for SDTX communications). In such alternative implementations, no S1-U_SDTX interface exists for non-SDTX EPS bearers when the UE is not in the NDTX mode. With this alternative, if a downlink traffic data message arrives on any of the non-SDTX-available bearers, the S-GW 108 sends a DDN to the MME 106 so that the MME 106 can initiate a normal network initiated service request procedure for user plane traffic data communications.

Figure 8:
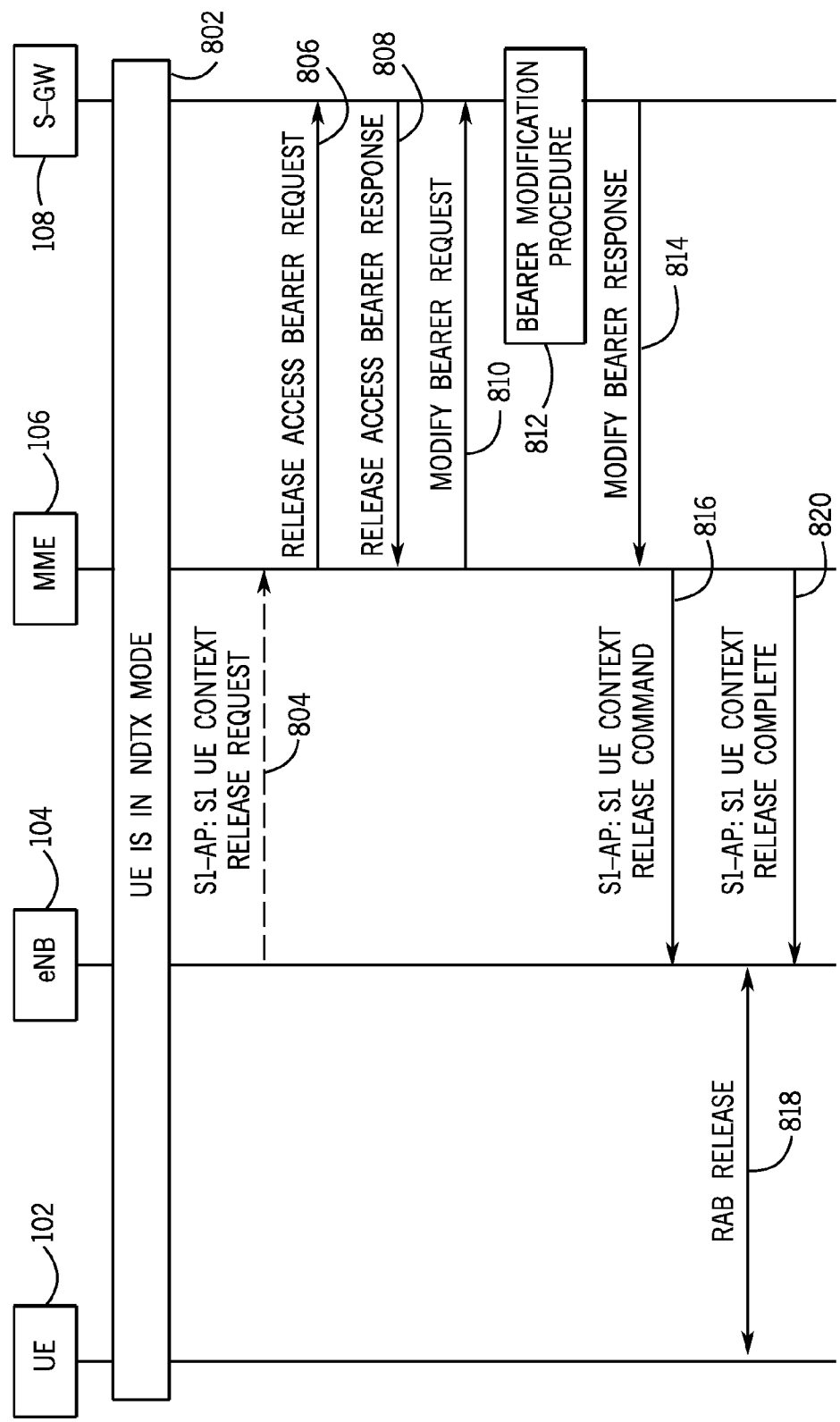
FIG. 8 is a message flow diagram for establishing a user plane path between a Mobility Management Entity (MME) and a serving gateway (S-GW), according to some implementations.

FIG. 8 illustrates a process for establishing the S1-U_S-DTX interface 120. Initially, it is assumed that the UE 102 is in NDTX mode (802). When the MME 106 determines that the UE 102 should enter the idle mode, either based on the S1 UE Context Release Request message from the eNB 104 sent (at 804) in FIG. 8, or on the MME's own decision, the MME 106 sends (at 806) a request to release the S1-U bearer between the S-GW 108 and the eNB 104, such as by sending a Release Access Bearer Request message to the S-GW 108. The S-GW 108 responds (at 808) with a Release Access Bearer Response message. This Release Access Bearer Request/Response handshake can be skipped if the S1-U_S-DTX interface 120 is established for all the EPS bearers for the UE.

The MME 106 prepares user plane contexts for each SDTX EPS bearer, such as by preparing a Fully Qualified Tunnel End Point Identifier (F-TEID) on a pseudo bearer towards the S-GW 108. The MME 106 sends (at 810) a Modify Bearer Request message to the S-GW 108 informing that the S1-U is being redirected to the MME 106. In response to the Modify Bearer Request message, the S-GW 108 modifies the S1-U bearer (which is between the S-GW 108 and the eNB 104) to be part of the S1-U_SDTX interface 120 between the S-GW 108 and the MME 108. The S-GW 108 then sends (at 814) a Modify Bearer Response message to the MME 106 to indicate successful modification of the S1-U bearer.

The MME 106 continues the procedure by sending (at 816) a S1 UE Context Release Command message to the eNB 104 to cause the eNB 104 to release the context relating to the modified S1-U interface. In response, the eNB 104 releases (at 818) the corresponding RRC connection, and sends (at 820) an S1 UE Context Release Complete message to the MME 106.

Subsequently, if downlink traffic data arrives at the S-GW 108, the S-GW 108 forwards the downlink traffic data to the MME 106, over the S1-U_SDTX interface 120. If the MME 106 determines to use the SDTX mode for sending the downlink traffic data to the UE 102, the MME 106 initiates an SDTX session, as described further below. Note that the MME 106 may decide (e.g. based on SDTX configuration parameters) to move the UE from the idle mode to the SDTX mode (i.e. the MME decides to use SDTX for the data traffic), or from the idle mode to the NDTX mode (i.e. the MME decides to use regular connectivity/transport for the data traffic and establish user plane RABs with the UE).

Figure 9:
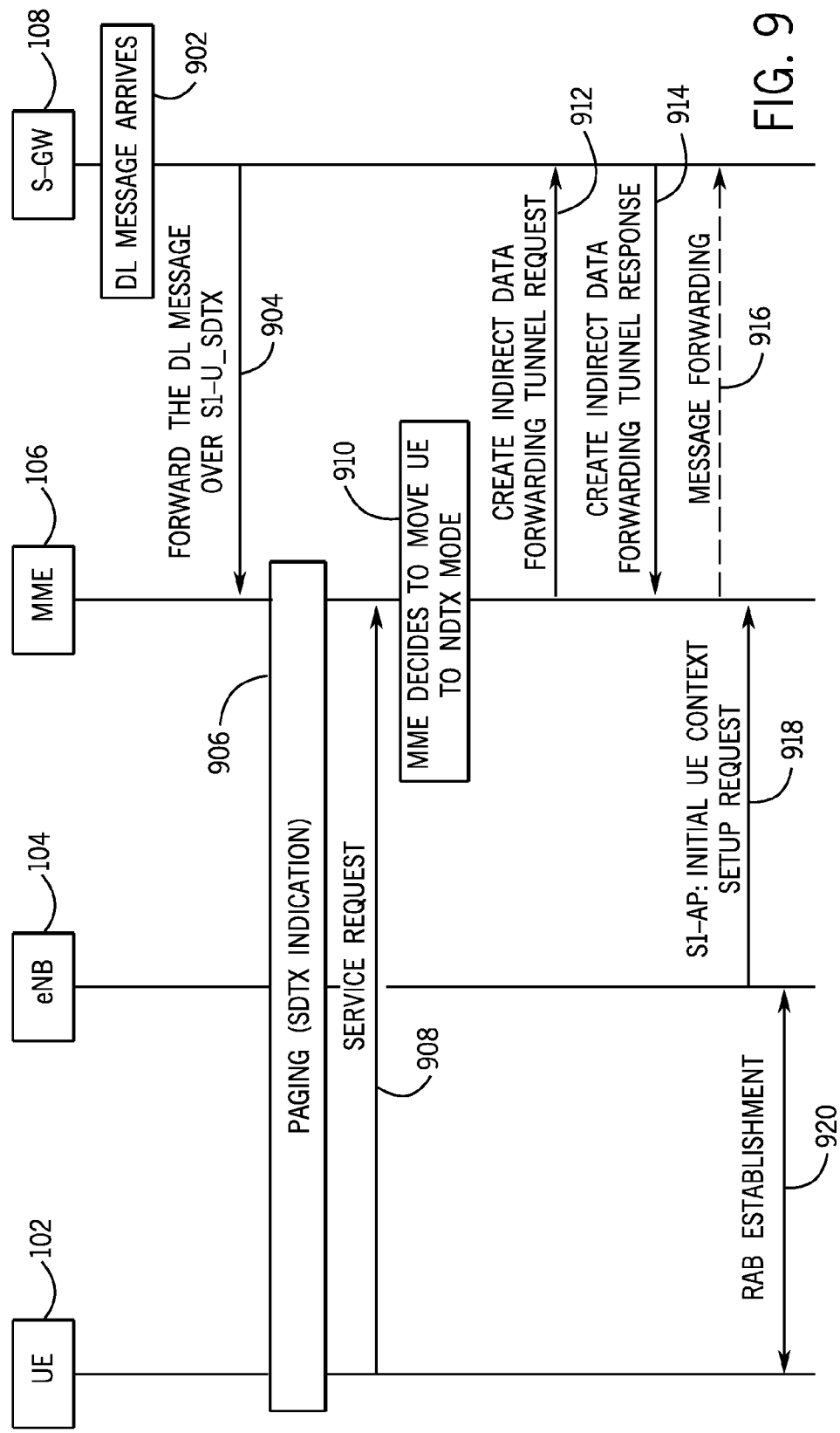
FIG. 9 is a message flow diagram of a procedure to transition to NDTX mode communication while pending downlink traffic data has not yet been delivered to a UE, in accordance with some implementations.

FIG. 9 illustrates an example in which the MME 106 decides to move the UE 102 to the NDTX mode while the MME 106 still has pending downlink data traffic to send to the UE 102. As shown in FIG. 9, a downlink data traffic message arrives (at 902) at the S-GW 108. The S-GW 108 forwards (at 904) the downlink data traffic message to the MME 106 over the S1-U_SDTX interface 120. The MME 106 then sends (at 906) a paging message to the UE 102, which can have the SDTX indication. In response to the paging message, the UE 102 responds (at 908) with a Service Request message.

However, prior to the MME 106 being able to send the downlink traffic data message received at 904 to the UE 102 using SDTX communication, the MME 106 decides (at 910) to move the UE 102 to the NDTX mode, such as in response to determining that the SDTX configuration parameters would be violated. In such a case, the MME 106 should send any buffered but un-sent downlink traffic data back to the S-GW 108 (e.g. behaving as a source eNB would behave during a handover by forwarding the pending traffic to the S-GW). To send the buffered downlink traffic data message back to the S-GW 108, the MME 106 can establish an Indirect Data Forwarding Tunnel towards the S-GW 108, by sending (at 912) a Create Indirect Data Forwarding Tunnel Request message to the S-GW 108. The S-GW 108 responds (at 914) with a Create Indirect Data Forwarding Tunnel Response message, at which point the buffered downlink traffic data messages can be forwarded (at 916) to the S-GW 108 before establishment of the S1-U bearer between the S-GW 108 and the serving eNB 104 for NDTX mode transmission of the downlink traffic data message. The MME 106 sends (at 918) an Initial UE Context Setup Request message to the eNB 104 to cause establishment (at 920) of the radio access bearer between the eNB 104 and the UE 102.

Note that according to implementations described in this section, no upgrade of the S-GW 108 has to be performed to support SDTX communications.

Alternative Interaction Between MME and S-GW

The interaction between the MME 106 and the S-GW 108 described in this section is different from that described in the previous section. The interaction between the MME 106 and S-GW 108 involve modifications of both the MME 106 and S-GW 108. Three scenarios are described below in connection with FIG. 10.

Figure 10:
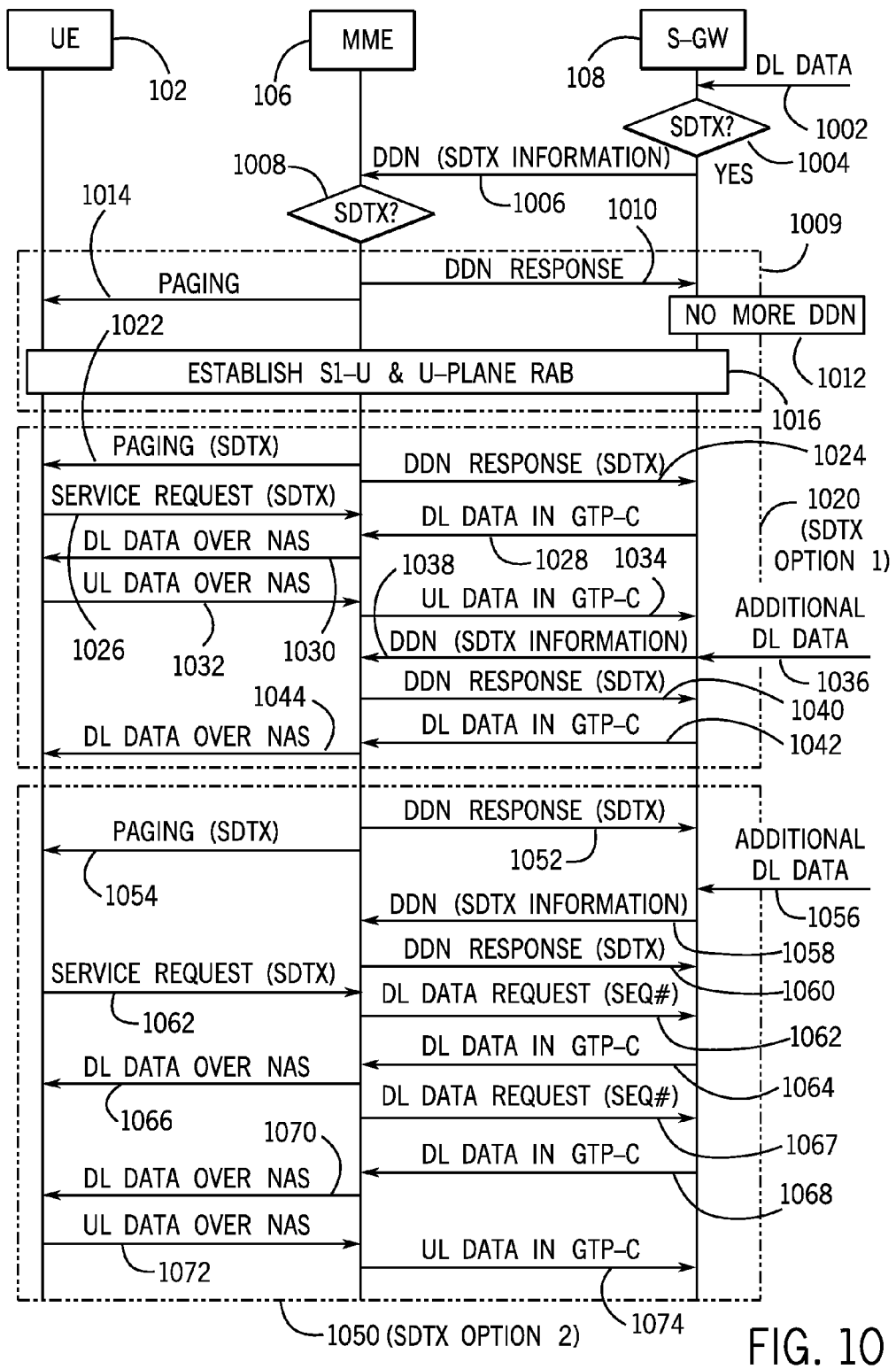
FIG. 10 is a message flow diagram of a process of communicating traffic data among a UE, an MME, and an S-GW, according to some implementations.

In a first scenario of FIG. 10, upon receiving (at 1002) a downlink traffic data message for the UE 102, the S-GW 108 determines (at 1004) whether SDTX communication should be used for delivery of the downlink traffic data for the UE. The S-GW 108 can make this determination by verifying the context information stored for the UE.

In the example of FIG. 10, it is assumed that the S-GW 106 determines (at 1004) that SDTX procedures should be used; in this case, the S-GW sends (at 1006) a DDN message to the MME 106 containing information specific to SDTX (e.g. the number of downlink traffic data messages that have been buffered, the size of each buffered downlink traffic data message, etc.). Note that the MME 106 can forward the value of the SDTX flag or other indicator to the S-GW 106, which can be specific to the UE or a bearer, so that the S-GW 108 can use the value of the SDTX flag or other indicator to determine whether the DDN message containing information specific to SDTX should be sent (at 1004) to the MME 106 in response to receipt of downlink traffic data packets by the S-GW 108.

Upon receiving the DDN message containing SDTX information, the MME 106 decides (at 1008) whether SDTX or regular user-plane connectivity should be used to deliver data to the UE 102—in other words, the MME 106 decides whether to trigger a procedure to transition the UE 102 into the SDTX mode, or to transition the UE 102 into the NDTX mode.

In the first scenario of FIG. 10 (represented by procedure 1009), it is assumed that the MME 106 decides to perform a regular network-initiated Service Request procedure. In procedure 1009, the MME 106 sends (at 1014) a paging message (in other words, SDTX is not to be used) for establishing (at 1016) a user plane RAB and S1-U bearer. In addition, the MME 106 sends (at 1010) a legacy DDN Response message that contains an acknowledgement of the DDN message sent at 1006. The S-GW 108 will not send (1012) another DDN containing SDTX information for subsequent downlink traffic data messages.

If the MME 106 determines (at 1008) that the downlink traffic data message(s) should be communicated using SDTX communication, then the MME 106 can use one of two procedures (option 1 of procedure 1020 or option 2 of procedure 1050) following the determination at 1008.

Options 1 and 2 relate to different options for triggering the S-GW 108 to forward a received downlink traffic data message to the MME 106. In option 1, the S-GW 108 forwards the downlink data traffic to the MME upon receiving a DDN response (that is responsive to a DDN message sent by the S-GW 108) from the MME 106 containing an SDTX indication. With option 1, the DDN response message works as a data request message as well as the acknowledgement of the DDN message.

In option 2, the functionalities for acknowledging the DDN message and requesting the downlink traffic data message from the S-GW 108 are split into two separate messages. A DDN response acknowledges the receipt of the DDN message sent by the S-GW. When the MME 106 wants to receive the downlink traffic data message from the S-GW 108, the MME 106 sends a Downlink Data Request message to the S-GW 108. The S-GW 108 forwards the buffered downlink traffic data message to the MME 106 in response to receiving the Downlink Data Request message from the MME 106.

In procedure 1020, where option 1 is used, the MME 106 sends (at 1022) a paging message with the SDTX indication following the determination (at 1008) that SDTX is to be used. In response to the paging message, the UE 102 sends (at 1026) a Service Request message (containing the SDTX indication) to the MME 106.

The MME 106 also sends (at 1024) a DDN Response message containing an SDTX indication to indicate that the MME 106 supports SDTX communication. In response to the DDN Response message with SDTX indication, the S-GW 108 sends (at 1028) the downlink traffic data message to the MME 106. The downlink traffic data message sent by the S-GW 108 to the MME 106 can be a GTP-C (General Packet Radio Service Tunneling Protocol-Control Plane) message. More specifically, the downlink traffic data message is encapsulated by a GTP-C envelop. GTP-C is a protocol for carrying control signaling in the core network. In response to the downlink traffic data message received from the S-GW 108, the MME 106 sends (at 1030) the downlink traffic data message in NAS signaling.

In the procedure 1020, the UE 102 can also send (at 1032) an uplink traffic data message in NAS signaling to the MME 106. In response, the MME 106 sends (at 1034) the uplink traffic data message to the S-GW 108 in a GTP-C message.

Since the S-GW has received the DDN Response message containing the SDTX indication from the MME 106 (sent at 1024), the S-GW 108 will send further DDN messages to the MME 108 upon receipt of further downlink traffic data. As shown in FIG. 10B, upon receiving (at 1036) additional downlink traffic, the S-GW 108 sends (at 1038) an updated DDN message to the MME. The updated DDN message sent by the S-GW 108 includes SDTX information (e.g. the number of downlink traffic data messages that have been buffered, the size of each buffered downlink traffic data message, etc.). The MME 106 responds by sending (at 1040) a DDN Response message containing the SDTX indication. In response, the S-GW 108 sends (at 1042) the additional downlink traffic data in a GTP-C message to the MME 106, which then sends (at 1044) the additional downlink traffic data in NAS signaling to the UE 102.

The third scenario of FIG. 10 is depicted as procedure 1050, which uses option 2. The procedure 1050 is performed following the determination (at 1008) by the MME 106 that SDTX is to be used.

In the procedure 1050, the MME 106 sends (at 1052) to the S-GW 108 a DDN Response message, which is responsive to the DDN sent at 1006. The MME 106 also sends (at 1054) a paging message containing the SDTX indication.

As additional downlink traffic data is received (at 1056) by the S-GW 108, the S-GW 108 can send (1058) another DDN message to the MME 106, which contains information regarding all backlogged downlink traffic data at the S-GW 108 (backlogged downlink traffic data refers to downlink traffic data not yet delivered by the S-GW 108 to the MME 106). The MME 106 sends (at 1060) a DDN Response message (containing the SDTX indication), in response to the DDN message sent at 1058.

Upon receiving a Service Request message sent (at 1062) by the UE 102 to the MME 106 in response to the paging message, the MME 106 sends (at 1062) a Downlink Data Request message to the S-GW 108 to request the downlink traffic data message. In some examples, the Downlink Data Request message can be a newly introduced GTP-C message. The Downlink Data Request message can identify a specific sequence number or other identifier of the downlink traffic data message requested by the MME 106.

In response to receiving the Downlink Data Request message, the S-GW 108 sends (at 1064) the downlink traffic data message encapsulated by a GTP-C envelop. Information regarding backlogged downlink traffic data messages may be piggy-backed with the message sent at 1064. The MME 106 extracts the downlink traffic data message from the GTP-C message and encapsulates the downlink traffic data message in NAS signaling, which is sent (at 1066) to the UE 102. The MME 106 can then request (at 1067) the next backlogged downlink traffic data message, which is sent (at 1068) by the S-GW 108 to the MME 106. The MME 106 then sends (at 1070) the extracted downlink traffic data message in NAS signaling to the UE 102. The foregoing can be repeated until no backlogged downlink traffic messages are indicated in the downlink traffic data message encapsulated by a GTP-C message.

In the procedure 1050, the UE 102 can also send (at 1072) uplink traffic data in NAS signaling to the MME 106, and the MME 106 can send (at 1074) the uplink traffic data in a GTP-C message.

As depicted in the procedure 1050, during the time interval from the time when the DDN was sent (at 1006) by the S-GW 108 to the MME 106, and the time when the Service Request message is sent (at 1062) from the UE 102, more downlink traffic data has arrived at the S-GW 108. In some cases, the newly arrived downlink traffic data may cause violation of SDTX configuration parameters.

Thus, whenever a new downlink traffic data message arrives at the S-GW 108, and the MME 106 is notified of the new downlink traffic data message using the DDN (similar to that sent at 1004), the MME 106 has to re-consider its previous decision on whether or not to use SDTX communication.

As long as the MME 106 determines to continue to transmit the downlink traffic data message(s) using SDTX communications, the MME 106 does not respond to the DDN (or responds to the DDN with an SDTX indication). If the S-GW 108 has not received a DDN acknowledgement (or acknowledgement with SDTX indication) and a new downlink traffic data message arrives, the S-GW 108 sends a new DDN message to the MME. The new DDN message will include the information of all the backlogged downlink traffic data messages.

If the MME 106 determines that SDTX cannot be used any longer at any time, the MME 106 can use the procedure of FIG. 6 to transition to NDTX mode communication.

In some implementations, the GTP-C encapsulated messages containing uplink traffic data or downlink traffic data can include an EPS bearer ID (discussed further below).

In general, according to some implementations, a control node receives a downlink data notification from a serving gateway, where the downlink data notification includes information relating to a predefined transmission mode in which traffic data is sent to a wireless device in a control channel carrying control messages. The control node sends a response to the downlink data notification to the serving gateway, where the response includes an indication that the control node supports the predefined transmission mode.

In some implementations, the control node determines to use the predefined transmission mode. In response to the determining, the control node sends, to the wireless device, a paging message with an indication indicating that the predefined transmission mode is to be used.

In some implementations, in response to receiving a message responsive to the paging message, where the responsive message contains the indication that the predefined transmission mode is to be used, the control node requests downlink traffic data from the serving gateway.

In some implementations, the response acknowledges the downlink data notification and is a request for downlink traffic data from the serving gateway.

In some implementations, the control node communicates traffic data in a GTP-C message.

Discovering SDTX Support

To allow for SDTX communications, mechanisms for the wireless communications network nodes and UEs to inform each other whether SDTX communications is supported. For example, the eNB 104 has to know whether a UE is SDTX-capable such that the eNB 104 can select an SDTX-capable MME when MME selection is performed. The MME 106 has to know whether a UE is SDTX-capable for the following reasons. If the UE is not SDTX-capable, the MME 106 cannot use SDTX for any downlink traffic data delivery. Thus, MME 106 has to know if the UE is SDTX-capable to make a decision regarding whether or not to use SDTX communications for the downlink traffic data. Also, the MME 106 may perform selection of a target MME when a handover (HO) between eNBs is being performed. The handover can be an intra-RAT (radio access technology) or inter-RAT handover. During handover, the MME can select an SDTX-capable MME if the UE is SDTX-capable and there is SDTX-capable MME among the potential target MMEs. It is possible that not all the UEs served by an SDTX-capable MME are SDTX-capable. An SDTX-capable MME might have been selected for non SDTX-capable UEs just for load balancing purpose. Thus, the source MME has to have information whether the UE is SDTX-capable when the source MME selects the target MME.

The UE can inform the network of SDTX support using the following mechanisms. The UE can indicate to the network (e.g. the eNB 104) of SDTX support by providing an SDTX indication in AS signaling. The eNB 104 may also relay the SDTX indication to the MME 106 in signaling for EPS Mobility Management (EMM). Alternatively, the SDTX indication can be provided in NAS signaling as part of EMM procedures (e.g. attach, tracking area update, etc.), to indicate support of the SDTX feature.

The network can provide notification of SDTX support using one of various mechanisms. Upon receiving an indication from a UE that the UE supports the SDTX feature, if the network supports the SDTX feature and the network wants to configure the UE to use the SDTX feature, then the network can provide an SDTX indication to the UE. For example, the MME 106 can indicate to the UE the support of the SDTX feature by both the MME 106 and the eNB 104. Alternatively, the MME 106 and the eNB 104 may indicate separately to the UE that the MME 106 and eNB 104 support SDTX—for example, the MME 106 can include the SDTX indication in NAS signaling, and the eNB 104 can include the SDTX indication in AS signaling.

The upper layers in the UE (e.g. applications) can indicate to the lower layers (e.g. NAS layer, AS layer, etc.) whether SDTX is to be used and/or is supported. The upper layers can provide the SDTX indication using a specified interface or specified commands.

Alternatively, the UE can be configured (e.g. based on subscription information, user preferences, operator preferences, or configuration information created and/or stored when new applications are installed) to act as an SDTX device for certain applications and/or access point names (APNs). For example, the NAS layer and/or AS layer of the UE are configured to know that the UE is to behave as an SDTX device. The UE may be configured to act as SDTX device for all APNs or only for one or more specific APNs.

In a first option, upon receiving an indication from the upper layers that SDTX should be used and/or supported, and when the UE is configured to act as an SDTX device for one or more applications and/or APNs, then the AS layer should indicate to the network in AS signaling (e.g. signaling for establishing a signaling bearer for EMM procedures such as attach, tracking area update, etc.) that the UE is SDTX-capable.

In the first option, an SDTX-capable UE that is configured to use SDTX provides an SDTX indication whenever the UE requests establishment of an RRC connection. An SDTX-capable UE can add the flag indicating that it is SDTX-capable in an RRCConnectionRequest message or RRCConnectionSetupComplete message. If the eNB 104 has to perform MME selection and the eNB 104 determines that the UE is SDTX-capable based on the SDTX indication in the RRCConnectionRequest or RRCConnectionSetupComplete message, the eNB 104 selects an SDTX-capable MME if available.

In a second option, since the eNB 104 performs selection of an MME 106 only when the UE performs certain procedures, such as an attach procedure or tracking area update (TAU) procedure, the UE includes the SDTX indication in an RRCConnectionRequest message or RRCConnectionSetupComplete message only when the UE performs such procedures, including the attach procedure, TAU procedure, etc. To enable this second option, upon performing an attach or TAU procedure, the NAS layer of the UE indicates to the lower layers (e.g. the AS layer) that the lower layers should provide an SDTX indication to the network for indicating support for SDTX.

In a third option, the SDTX capability of the UE is provided to the MME 106 by having the SDTX indication relayed by the eNB 104 to the MME 106. For example, upon receiving the SDTX indication in a received RRCConnectionSetupComplete message (or RRCConnectionRequest message), the eNB 104 places the SDTX indication in an Initial UE message when the eNB 104 sends the Initial UE message to the MME 106. The Initial UE message is the first message that the eNB 104 sends to the MME 106 to establish a connection. If the MME 106 detects the SDTX indication in the Initial UE message, the MME 106 saves the SDTX indication (such as by setting an SDTX flag or other indicator) as part of the UE EMM context information. If a previous UE EMM context exists, the MME 106 updates the state of the SDTX flag based on detecting the SDTX indication in the Initial UE message.

This update can be useful if a new application is installed and the application wishes to use SDTX or wishes to disable SDTX.

In a fourth option, an alternative way of the relaying the SDTX indication to MME 106 is that the UE sends the SDTX indication in a NAS message directly to the MME 106. Upon receiving an SDTX indication from the upper layers that SDTX is to be used and/or supported, or when the UE is configured to act as an SDTX device for one or more applications and/or APNs, then the UE NAS layer may indicate to the network in NAS signaling that the UE is SDTX-capable.

An SDTX-capable UE may indicate to the network whether the UE supports SDTX independently of the applications running in the UE. In some scenarios, there may be multiple active applications on a UE, some of which utilize or are configured to use the SDTX feature while the others do not. In such scenario, the UE may indicate that the UE is SDTX-capable to network in NAS signaling.

In some other examples, the UE may indicate it is SDTX-capable to the network in NAS signaling only if all the applications running on the UE utilize or are configured to use the SDTX feature.

In the fourth option, an SDTX-capable UE adds the SDTX indication indicating that the UE is SDTX-capable in a NAS message, including as an example an ATTACH REQUEST message, a TAU REQUEST message, and so forth. Upon receiving a message from the UE, if the MME 106 detects the SDTX indication, then the MME 106 saves the SDTX indication as a part of the UE EMM context information. If a previous UE EMM context exists, the MME 106 can update the value of the SDTX flag or other indicator, based on the SDTX indication in a message.

The SDTX capability of network nodes can also be provided to a UE for the UE to make a decision if SDTX is to be used or not.

In a fifth option, the MME 106 and/or eNB 104 sends their capability independently. In the fifth option, if the MME 106 is SDTX-capable and the MME 106 determines that the UE is SDTX-capable (e.g. upon receiving an SDTX indication from the UE), the MME 106 includes the SDTX indication in a NAS message to the UE (e.g. in an ATTACH ACCEPT message, a TRACKING AREA UPDATE ACCEPT message, etc.). Upon receiving a NAS message containing the SDTX indication from the MME 106, the UE saves the SDTX indication as part of an EMM context. When the UE has to send uplink traffic data, the UE determines whether or not to use SDTX based on the MME SDTX capability it has stored and based on whether the uplink traffic data meets the SDTX criteria.

If the eNB 104 is SDTX enabled, then the eNB 104 includes the SDTX indication in the downlink AS signal message during an RRC connection establishment in RRC response messages to the UE.

Selecting MME

A network operator may deploy more than one MME to service the same coverage area (these MMEs are part of an MME pool). In such a deployment, the eNB 104 selects the MME from the MME pool with which the UE will communicate. Not all the MMEs in the network may be capable of handling SDTX. Thus, when the network selects an MME for an SDTX-capable UE, the network selects an SDTX-capable MME.

In some implementations, MME selection is performed by the eNB 104 when the UE attaches to the network, or when the UE performs a TAU procedure. MME selection can be based on the network topology and load balancing factors. The eNB 104 should also consider whether the UE is SDTX-capable when the eNB 104 selects the MME. When the eNB 104 receives an indication from a UE that the UE is SDTX-capable, then the eNB 104 selects one of the SDTX-capable MMEs if available.

MME selection can also be performed during handover from a source eNB to a target eNB. If the target eNB cannot be served by the source MME, the source MME may have to perform target MME selection. The source MME also has to consider whether the UE is SDTX-capable to select a target MME. If SDTX cannot be supported in the target MME, then the UE can be made aware of that.

MME selection can be performed by a source MME during intra-RAT handover or inter-RAT handover. In the case of inter-RAT handovers, instead of performing MME selection, selection of a different type of core network node can be performed, such as a serving GPRS support node (SGSN).

When the source MME has to select a new serving MME during a handover procedure, if the UE is SDTX-capable, then the source MME selects an SDTX-capable MME. If during handover an SDTX-capable MME cannot be selected, then the UE is informed by the network that SDTX is not available.

According to some examples, if a "Registered MME" information element in the RRCConnectionSetupComplete is not provided or the "Registered MME" information element is not reachable, the eNB 104 performs an MME selection procedure. This may occur during an attach procedure, TAU procedure, and so forth.

In a first option (corresponding to the initial MME selection), if the eNB 104 has to perform MME selection and the eNB 104 determines that the UE is SDTX-capable (e.g. based on the SDTX indication received from the UE in the RRCConnectionRequest or RRCConnectionSetupComplete message), then the eNB 104 selects an SDTX-capable MME if available.

In a second option, during an intra-RAT or inter-RAT handover procedure, the source MME selects an SDTX-capable MME if the flag saved in the UE EMM context indicates that the UE is SDTX-capable and if there is an SDTX-capable MME among the available target MMEs. The MME forwards the SDTX-capable flag as part of UE context information to the target MME whenever the MME relocation happens.

In general, according to some implementations, a network node determines whether a wireless device is capable of communicating in a predefined transmission mode in which traffic data is communicated in control messages, and in response to the determining, the network node selects one of a plurality of core network control nodes.

In some implementations, the control nodes are mobility management entities.

In some implementations, at least one of the plurality of core network control nodes are incapable of supporting the predefined transmission mode.

In some implementations, the network node is a wireless access network node.

In some implementations, the network node is a core network control node.

In some implementations, a wireless device can indicate support for traffic data communication according to the predefined transmission mode by including an indication in access stratum (AS) and/or non-access stratum (NAS) messaging sent to a network node.

In some implementations, a network node can indicate support for traffic data communication according to the predefined transmission mode by including an indication in access stratum (AS) or non-access stratum (NAS) messaging sent to a wireless device.

Delivery of SDTX Configuration Parameters

As discussed above, SDTX configuration parameters are used by UEs and MMEs to determine whether SDTX communication should be used for communicating traffic data. The SDTX configuration parameters may differ between different network operators. It is also possible that a network operator may implement dynamic configuration of SDTX based on the network conditions in a given area, such as the number of attached UEs in a cell or in a region, the average occupied radio bandwidth in a region at given time of a day, and so forth.

The issues to be addressed include:
- determining how to deliver SDTX configuration parameters to a UE, including identifying which layer (e.g. AS or NAS layer) is suitable for such communication and what messages and parameters are used;
- determining how often SDTX configuration parameters should be delivered in order to allow the UE to use the SDTX feature with the correct parameters (e.g. based on the UE location) and in order to reduce the overhead caused by signaling such information; and
- ensuring that SDTX configuration parameters in a UE is up to date. For example, it is possible that the SDTX configuration parameters may change in between NAS signaling exchanges, such as for an attach procedure or TAU procedure. If so, at any given time, a UE may have incorrect information about the SDTX configuration parameters.

In some implementations, the network (MME 106 or eNB 104) can also include SDTX configuration parameters in messaging sent by the network to the UE indicating that the network supports SDTX. In such implementations, the SDTX configuration parameters can be provided in messaging provided by the AS or NAS layer. For example, if the UE supports SDTX and the network supports SDTX, then the network can provide to the UE the SDTX configuration parameters in NAS signaling, such as in any of the following: Attach Accept message, TAU Accept message, PDN CONNECTIVITY ACCEPT or REJECT message, SERVICE REJECT message, and so forth.

In alternative implementations, the MME 106 may provide to the UE the SDTX configuration parameters when MME 106 responds to a Service Request message with the SDTX indication (such as with the message sent at 410 in FIG. 4). In this way, it can be ensured that the UE has up-to-date SDTX configuration parameters.

If UE determines that the pending uplink data violates the latest SDTX configuration parameters, then the UE can signal to the network that it has to move to the NDTX mode, such as described above in the "Transitioning from the SDTX Mode to the NDTX Mode" section.

Upon successful completion of a Service Request procedure, if the procedure is for SDTX and the network indicated SDTX, then a UE does not locally deactivate EPS bearer contexts that do not have a user plane radio bearer established and enters the SDTX mode.

Upon receiving the SDTX configuration parameters from the network, the UE stores the SDTX configuration parameters and may relay the information to the upper layers, including application layer. If there are existing SDTX configuration parameters stored in the UE, the UE may replace the existing SDTX configuration parameters with the newly received configuration parameters.

In general, according to some implementations, a network node sends, to a wireless device, at least one configuration parameter relating to a predefined transmission mode in which traffic data is communicated in a control channel for carrying control messages, wherein the at least one configuration parameter specifies at least one threshold relating to communication of the traffic data in the control channel.

In some implementations, the at least one threshold is selected from among an upper threshold on a size of a message for carrying traffic data, an upper threshold relating to a number of messages carrying traffic data that can be sent in a sequence or in a given time interval, an upper threshold on a time length of a session in which traffic data is communicated in the predefined transmission mode, and an identity of a radio bearer (or identities of radio bearers) that is (are) specified for carrying traffic data in the predefined transmission mode.

In some implementations, the network node is a wireless access network node.

In some implementations, the network node is a core network control node.

Bearer Mapping of SDTX Messages

For proper communication of traffic data in SDTX communications, an uplink traffic data message sent using SDTX is mapped to a respective EPS bearer at the S-GW 108 for proper routing. The MME 106 is able to determine the corresponding EPS bearer on receiving the uplink traffic data message from the UE.

A downlink traffic data message sent using SDTX is mapped to a respective EPS bearer at the UE. The UE should be able to determine the corresponding EPS bearer on receiving an SDTX downlink traffic data message.

In some implementations, the MME 106 or UE 102 can include an EPS bearer ID when the MME or UE sends a downlink or uplink traffic data message using SDTX to each other using NAS signaling. The provided EPS bearer ID can be used for mapping to a corresponding EPS bearer. This EPS bearer ID can be a new information element in a generic NAS container header, or a payload field of the NAS container can include the EPS bearer ID and user plane data.

When the UE transmits an uplink traffic data message using SDTX, the UE 102 encapsulates the data in NAS signaling and adds the EPS bearer ID corresponding to the PDN connection the data traffic belongs to. Upon receiving an uplink traffic data message from the UE 102 containing the EPS bearer ID, the MME 106 routes the received data from the UE 102 to the EPS bearer corresponding to the EPS bearer ID on the S1-U_SDTX interface if a solution described in the "Interaction between MME and S-GW" section is used. For example, the MME 106 includes the EPS bearer ID in a GTP-C message in which the uplink traffic data is forwarded to the S-GW 108, and the S-GW 108 uses the EPS bearer ID to map the uplink traffic data to the correct GTP tunnel.

Upon receiving an uplink traffic data message from the UE 102 containing the EPS bearer ID, the MME 106 includes the EPS bearer ID in a corresponding message sent to the S-GW 108 if a solution described in the "Alternative Interaction between MME and S-GW" section is used.

Upon receiving a downlink traffic data message from the S-GW 108, the MME 106 includes an EPS bearer ID in a message sent to the UE 102. The UE 102 uses the EPS bearer ID to route the data to the application(s) corresponding to the identified EPS bearer. For example, the NAS layer at the UE 102 determines that a received NAS message corresponds to an STDX communication based on an SDTX indication in the NAS header. The NAS layer then forwards the message to the SDTX handler. The SDTX handler uses the EPS bearer ID to route the data to the corresponding application.

In general, according to some implementations, a network node sends, to a wireless device, a control message containing downlink traffic data, wherein the control message further includes an identifier of a bearer, and wherein the identifier of the bearer is useable by the wireless device to map to a respective bearer.

In some implementations, the network node is a mobility management entity (MME).

In some implementations, the MME receives uplink traffic data in a control message that includes an identifier of a bearer, and the MME routes the uplink traffic data to a serving gateway (S-GW) using the identifier of the bearer.

In general, according to some implementations, a wireless device sends, to a network node, a control message containing uplink traffic data, wherein the control message further includes an identifier of a bearer, and wherein the identifier of the bearer is useable by the network node to map to a respective bearer.

In some implementations, the control message is a non-access stratum (NAS) message.

Example System Architecture

Figure 11:
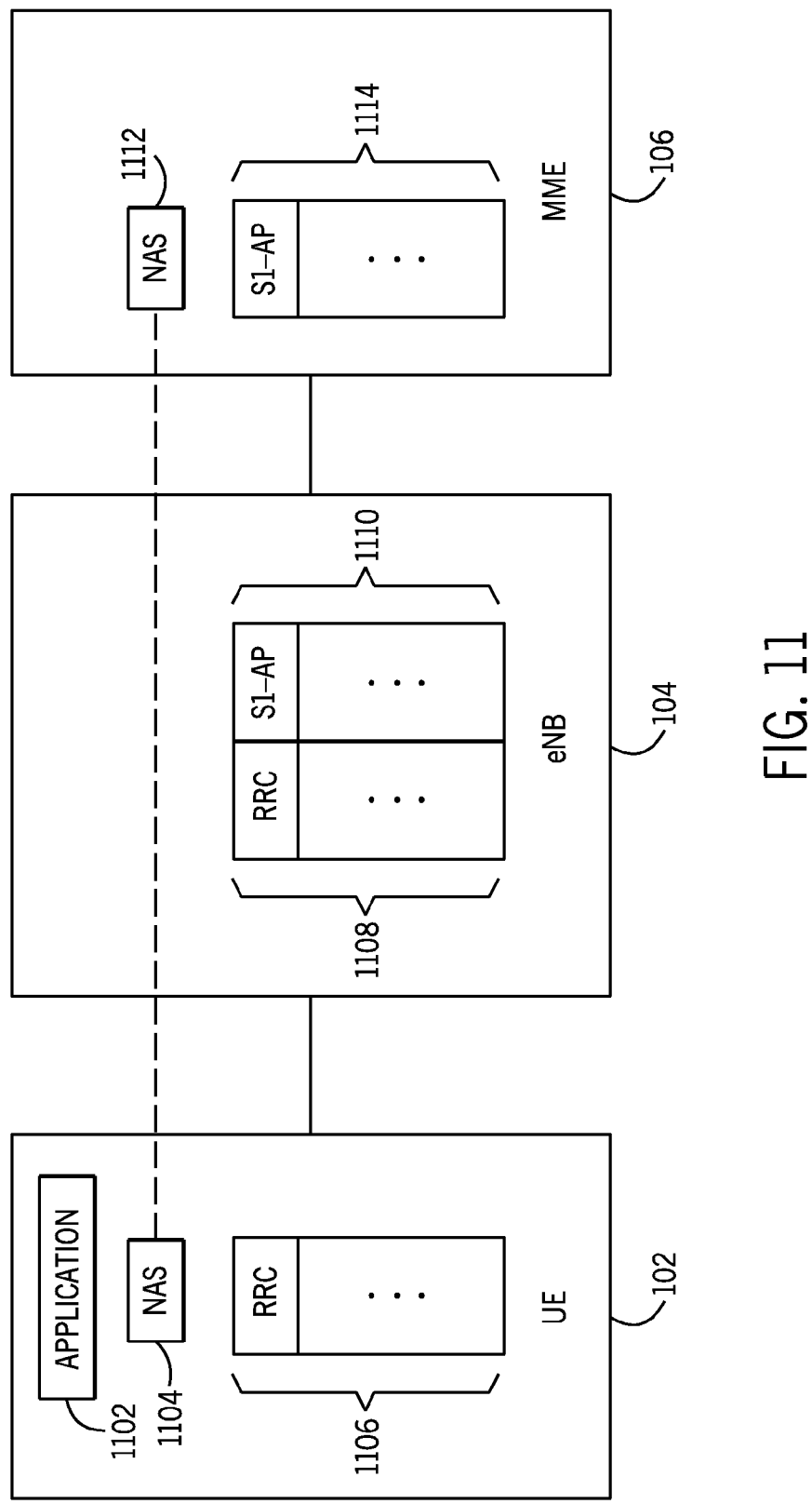
FIG. 11 is a block diagram of protocol layers in a UE, an enhanced node B, and an MME, according to some implementations.

FIG. 11 depicts various components of the UE 102, eNB 104, and MME 106, according to some implementations. The UE 102 includes an application (or multiple applications) 1102, an NAS layer 1104 (to communicate NAS signaling), and an AS layer 1106, which includes various protocol layers such as an RRC layer and other layers. The RRC layer is used to establish an RRC connection over the air interface with the eNB 104.

The eNB 104 includes an AS layer 1108 that includes an RRC layer and other protocol layers. In addition, the eNB 104 includes a protocol stack 1110 to communicate with the MME 106, where the protocol stack 1110 includes an S1-AP layer and other protocol layers. The MME 106 includes an NAS layer 1112 to communicate NAS signaling with the UE 102, and a protocol stack 1114 to communicate with the eNB 104.

One or more of the NAS layers 1104 and 1112, the AS layers 1106 and 1108, and the protocol stacks 1110 and 1114 can be modified to include SDTX logic to support SDTX communications as discussed above.

Figure 12:
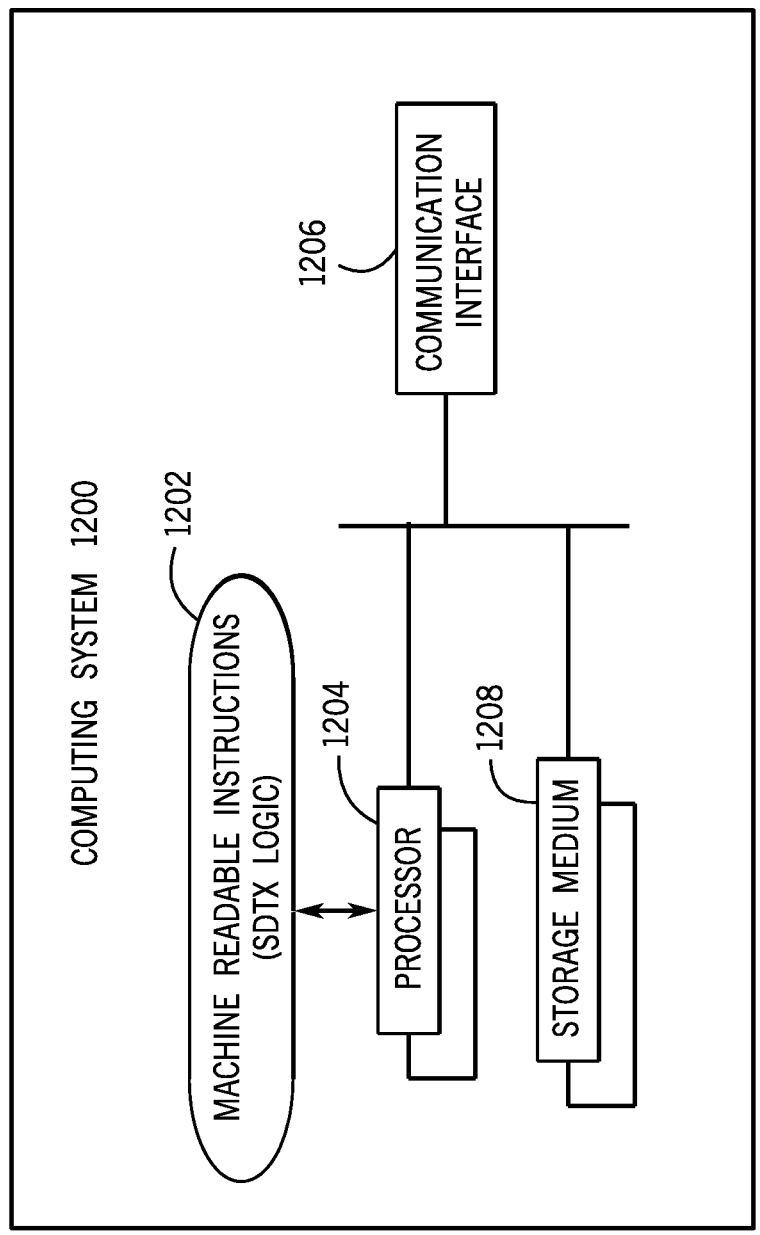
FIG. 12 is a block diagram of a computing system according to some implementations.

FIG. 12 depicts a computing system 1200, which can be any of a UE 102, eNB 104, MME 106, or S-GW 108. The computing system 1200 includes machine-readable instructions 1202 (which can include SDTX logic to support SDTX communications), which are executable on a processor (or multiple processors) 1204. In the UE, the SDTX logic can include an SDTX handler as described in connection with FIG. 5. A processor can include a microprocessor, microcontroller, processor module or subsystem, programmable integrated circuit, programmable gate array, or another control or computing device.

The processor(s) 1204 can be coupled to a communication interface 1206 to perform communications. For example, the communication interface 1206 can perform wireless communicate over an air interface, or perform wired communication over a wired connection.

The processor(s) 1204 can also be coupled to a computer-readable or machine-readable storage medium (or storage media) 1208, for storing data and instructions. Data that can be stored can include SDTX configuration parameters, mapping information, UE context information, and so forth, as discussed above. The storage medium or storage media 1208 can include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
   detecting, by a control node in a core network of a wireless communications network, that a wireless device is to transition to an idle mode, wherein the wireless communications network further comprises a data gateway to route data traffic to and from the wireless device, wherein the data gateway initially has a user plane path with a wireless access network node to carry traffic data of the wireless device;
   in response to detecting that the wireless device is to transition to the idle mode, performing, by the control node, a procedure to switch the user plane path between the data gateway and the wireless access network node to a user plane path between the control node and the data gateway, the user plane path between the control node and the data gateway defined between an address of the control node and an address of the data gateway, and the user plane path between the control node and the data gateway useable for communication of traffic data of the wireless device between the control node and the data gateway;
   determining, by the control node, that traffic data is pending for delivery to the wireless device configured for a predefined transmission mode in which traffic data is communicated in a control channel for carrying control messages;
   in response to determining that traffic data is pending for delivery to the wireless device, sending, by the control node, a first message to the wireless device, the first message containing an indication that the predefined transmission mode is to be used; and
   receiving, by the control node from the wireless device, a second message that is responsive to the first message, the second message containing an indication that the predefined transmission mode is to be used.

2. The method of claim 1, further comprising:
   in response to the second message, sending, by the control node, the pending traffic data in the control channel to the wireless device.

3. The method of claim 1, wherein the first message is a paging message.

4. The method of claim 3, wherein the second message is a service request containing the indication that the predefined transmission mode is to be used, or an extended service request containing the indication that the predefined transmission mode is to be used.

5. The method of claim 4, wherein the service request is transmitted by the wireless device following establishment of a radio resource control (RRC) connection.

6. The method of claim 1, wherein sending the first message containing the indication causes establishment of the control channel for carrying the pending traffic data, without establishing a traffic channel for carrying traffic data relating to the wireless device.

7. The method of claim 1, wherein the wireless device has an idle mode, a normal data transmission mode, and the predefined transmission mode, and wherein sending the first message causes transition of the wireless device from the idle mode to the predefined transmission mode.

8. The method of claim 1, wherein the predefined transmission mode is a small data transmission (SDTX) mode.

9. The method of claim 1, wherein the control channel is a non-access stratum (NAS) channel.

10. The method of claim 1, wherein the indication contained in the first message is included in a CN-Domain information element.

11. The method of claim 1, further comprising:
starting, by the control node, an inactivity timer upon sending or receiving traffic data communicated in the predefined transmission mode; and
in response to timeout of the inactivity timer, sending, to the wireless access network node, a message to release a radio connection between the wireless access network node and the wireless device.

12. The method of claim 1, further comprising:
receiving, by the control node, an indication that the predefined transmission mode is to be used for uplink traffic data from the wireless device; and
in response to determining that the predefined transmission mode can be used for the uplink traffic data, sending, by the control node to the wireless device, a control message containing an indication that the control node is ready to accept receipt of the uplink traffic data communicated using the predefined transmission mode.

13. The method of claim 1, wherein the procedure to switch comprises:
sending, by the control node, a Modify Bearer Request message to the data gateway informing the data gateway that the user plane path between the data gateway and the wireless access network node is being redirected to the user plane path between the control node and the data gateway.

14. The method of claim 1, wherein the procedure to switch further comprises:
sending, by the control node to the wireless access network node, a message to cause the wireless access network node to release a context relating to the user plane path between the data gateway and the wireless access network node.

15. The method of claim 1, further comprising:
sending, by the control node, an indication to the data gateway that the control node supports the predefined transmission mode.

16. A user equipment comprising:
a communication interface to wirelessly communicate with a wireless access network node that is coupled to a control node in a core network; and
at least one processor configured to:
receive, in the user equipment, uplink traffic data to be sent;
decide, based on configuration information in the user equipment, whether a predefined transmission mode is to be used, wherein, in the predefined transmission mode, the uplink traffic data is communicated in a control channel for carrying control messages;
in response to deciding to use the predefined transmission mode, send, to the control node, a first message containing an indication that the predefined transmission mode is to be used for the uplink traffic data;
receive, from the control node, a second message that is responsive to the first message, the second message indicating that the control channel is ready to use for sending the uplink traffic data; and
in response to the second message, send, to the control node, the uplink traffic data in the control channel.

17. The user equipment of claim 16, wherein the at) least one processor is configured to further:
receive the configuration information from the wireless access network node.

18. The user equipment of claim 16, wherein the user equipment is preconfigured with the configuration information.

19. The user equipment of claim 16, wherein the at least one processor is configured to further:
determine, based on the configuration information, whether the uplink traffic data is eligible for transmission using the predefined transmission mode;
in response to determining that the uplink traffic data is eligible for transmission using the predefined transmission mode, determine a current mode of the user equipment.

20. The user equipment of claim 19, wherein the at least one processor is configured to further:
in response to determining that the current mode is a normal data transmission mode, transmit the uplink traffic data using a traffic channel; and
in response to determining that the current mode is the predefined transmission mode, decide to use the predefined transmission mode and transmit the uplink traffic data in the control channel.

21. The user equipment of claim 20, wherein the at least one processor is configured to further:
in response to determining that the current mode is an idle mode, decide to use the predefined transmission mode and perform a procedure with the control node for establishing the control channel to allow carrying of the uplink traffic data.

22. The user equipment of claim 16, wherein the communication interface is configured to further receive a paging message containing an indication that the predefined transmission mode is to be used, the indication contained in the paging message being included in a CN-Domain information element.

23. The user equipment of claim 16, wherein the configuration information used to decide whether to use the predefined transmission mode comprises at least one parameter selected from among: a parameter specifying an upper threshold on a size of a message to carry data for the predefined transmission mode, a parameter specifying an upper threshold on a number of messages the user equipment can send in a specified time interval, and an upper threshold on a length of a session during which communication according to the predefined transmission mode is to occur.

24. A system comprising:
a control node for a core network of a wireless communication system;

a data gateway to route data traffic to and from a wireless device in the wireless communication system, wherein the data gateway is to initially have a user plane path with a wireless access network node to carry traffic data packets of the wireless device, and wherein the control node is to:
  detect that the wireless device is to transition to an idle mode, and
  in response to detecting that the wireless device is to transition to the idle mode, perform a procedure to switch the user plane path between the data gateway and the wireless access network node to a user plane path between the control node and the data gateway, the user plane path between the control node and the data gateway defined between an address of the control node and an address of the data gateway, and the user plane path between the control node and the data gateway useable for communication of traffic data packets of the wireless device between the control node and the data gateway.

25. The system of claim 24, wherein the data gateway is a serving gateway (S-GW), and the control node is a Mobility Management Entity (MME), and wherein the user plane path between the control node and the data gateway is a modified S1-U interface that is established between the S-GW and the MME.

26. The system of claim 24, wherein the user plane path between the data gateway and the wireless access network node is an S1-U interface, and
  wherein the switching includes redirecting the S1-U interface from the wireless access network node to the control node.

27. The system of claim 24, wherein the control node is to further:
  detect that the wireless device is to transition to a normal data transmission mode, and
  in response to detecting that the wireless device is to transition to the normal data transmission mode, perform a procedure to switch the user plane path between the data gateway and the control node to the user plane path between the data gateway and the wireless access network node.

* * * * *